(12) United States Patent
Morais et al.

(10) Patent No.: US 8,997,945 B1
(45) Date of Patent: *Apr. 7, 2015

(54) BRAKE CALIPER FOR DISC BRAKE ASSEMBLY AND METHOD AND APPARATUS FOR PRODUCING SAME

(75) Inventors: Eduardo Morais, South Lyon, MI (US); Harry Miller, Canton, MI (US)

(73) Assignee: Kelsey-Hayes Company, Livonia, MI (US)

( * ) Notice: Subject to any disclaimer, the term of this patent is extended or adjusted under 35 U.S.C. 154(b) by 796 days.

This patent is subject to a terminal disclaimer.

(21) Appl. No.: 11/699,318

(22) Filed: Jan. 29, 2007

Related U.S. Application Data

(63) Continuation-in-part of application No. 10/670,124, filed on Sep. 24, 2003, now Pat. No. 7,168,529.

(51) Int. Cl.
*F16D 55/00* (2006.01)
*F16D 55/04* (2006.01)

(52) U.S. Cl.
CPC ...................................... *F16D 55/04* (2013.01)

(58) Field of Classification Search
USPC .................. 188/71.1, 72.4, 72.5, 73.1, 73.39, 188/73.44, 73.45, 73.47
See application file for complete search history.

(56) References Cited

U.S. PATENT DOCUMENTS

| | | | | |
|---|---|---|---|---|
| 5,284,228 A | * | 2/1994 | Weiler et al. | 188/71.8 |
| 5,343,986 A | * | 9/1994 | Rogers et al. | 188/73.45 |
| 5,472,068 A | * | 12/1995 | Weiler et al. | 188/73.44 |
| 5,518,062 A | | 5/1996 | Kobayashi et al. | |
| 5,735,368 A | * | 4/1998 | Kobayashi et al. | 188/73.39 |
| 5,901,815 A | * | 5/1999 | Kobayashi et al. | 188/7 |
| 6,047,795 A | * | 4/2000 | Kobayashi et al. | 188/73.45 |

(Continued)

FOREIGN PATENT DOCUMENTS

| | | |
|---|---|---|
| DE | 10106591 C1 | 8/2002 |
| JP | 6-280908 A | 10/1994 |

(Continued)

OTHER PUBLICATIONS

European Search Report for Application No. 04 789 026.4-1523 dated Mar. 23, 2011.
Korean Office Action for Korean Application No. 7006242/2006.

*Primary Examiner* — Robert A Siconolfi
*Assistant Examiner* — James Hsiao
(74) *Attorney, Agent, or Firm* — MacMillan, Sobanski & Todd, LLC

(57) ABSTRACT

This invention relates to a brake caliper adapted for use in a vehicle disc brake assembly and method and apparatus for producing the same. The method for producing the brake caliper comprises the steps of: (a) providing a mold member having at least two mold sections; (b) providing a core member having at least a first male extension which is adapted to form an integrally cast locating recess in the brake caliper which is used as a locating surface for subsequent machining of the brake caliper; (c) disposing the core member in the mold member in a predetermined position; (d) supplying a suitable material to the mold member so as to form a brake caliper within the mold; (e) removing the brake caliper from the mold, wherein the brake caliper includes an integrally cast locating recess formed therein by the first male extension of the core member; and (f) machining the brake caliper using at least the integrally cast locating recess formed therein as a locating surface.

20 Claims, 27 Drawing Sheets

(56) References Cited

U.S. PATENT DOCUMENTS

| | | | |
|---|---|---|---|
| 6,257,378 B1 * | 7/2001 | Girkin et al. | 188/73.31 |
| 6,427,810 B2 * | 8/2002 | Schorn et al. | 188/73.39 |
| 6,502,673 B1 * | 1/2003 | Toriyama | 188/218 A |
| 6,648,104 B1 * | 11/2003 | Buckley et al. | 188/71.6 |
| 6,926,123 B2 | 8/2005 | Goebel et al. | |
| 2001/0013448 A1 * | 8/2001 | Schorn et al. | 188/71.1 |
| 2004/0195054 A1 * | 10/2004 | Thomas | 188/73.1 |

FOREIGN PATENT DOCUMENTS

| | | |
|---|---|---|
| JP | 6280908 A | 10/1994 |
| JP | 2000-514898 A | 11/2000 |
| JP | 2000514898 T | 11/2000 |
| WO | 98/03290 A1 | 1/1998 |
| WO | 9803290 A1 | 1/1998 |

* cited by examiner

BRAKE CALIPER FOR DISC BRAKE ASSEMBLY AND METHOD AND APPARATUS FOR PRODUCING SAME

CROSS-REFERENCE TO RELATED APPLICATIONS

This application is a continuation-in-part of U.S. Ser. No. 10/670,124, filed Sep. 24, 2003.

BACKGROUND OF THE INVENTION

This invention relates in general to vehicle disc brake assemblies and in particular to a brake caliper adapted for use in such a vehicle disc brake assembly and method and apparatus for producing the brake caliper.

Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are actuated by hydraulic or pneumatic pressure generated when an operator of the vehicle depresses a brake pedal. The structures of these drum brake assemblies and disc brake assemblies, as well as the actuators therefore, are well known in the art.

A typical disc brake assembly includes a rotor which is secured to the wheel of the vehicle for rotation therewith. The rotor includes a pair of opposed friction plates which are selectively engaged by portions of a caliper assembly. The caliper assembly is slidably supported by pins secured to an anchor plate. The anchor plate is secured to a non-rotatable component of the vehicle, such as the vehicle frame. The caliper assembly includes a pair of brake shoes which are disposed on opposite sides of the rotor. The brake shoes are operatively connected to one or more hydraulically actuated pistons for movement between a non-braking position, wherein they are spaced apart from the opposed friction plates of the rotor, and a braking position, wherein they are moved into frictional engagement with the opposed friction plates of the rotor. When the operator of the vehicle depresses the brake pedal, the piston urges the brake shoes from the non-braking position to the braking position so as to frictionally engage the friction plates of the rotor and thereby slow or stop the rotation of the associated wheel of the vehicle.

SUMMARY OF THE INVENTION

This invention relates to a brake caliper adapted for use in a vehicle disc brake assembly and method and apparatus for producing the same. The brake caliper of the present invention includes a cast brake caliper having an inboard leg portion and an outboard leg portion which are interconnected by an intermediate bridge portion. The brake caliper has a pair of locating surfaces provided on the inboard leg portion and a locating surface provided on the outboard leg portion. According to the present invention, the pair of locating surfaces provided on the inboard leg portion and the locating surface provided on the outboard leg portion are integrally formed by a core member of a casting apparatus during the casting of the brake caliper. The method for producing the brake caliper of the present invention comprises the steps of: (a) providing a mold member having at least two mold sections; (b) providing a core member having at least a first male extension which is adapted to form an integrally cast locating recess in the brake caliper which is used as a locating surface for subsequent machining of the brake caliper; (c) disposing the core member in the mold member in a predetermined position; (d) supplying a suitable material to the mold member so as to form a brake caliper within the mold; (e) removing the brake caliper from the mold, wherein the brake caliper includes an integrally cast locating recess formed therein by the first male extension of the core member; and (f) machining the brake caliper using at least the integrally cast locating recess formed therein as a locating surface.

Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
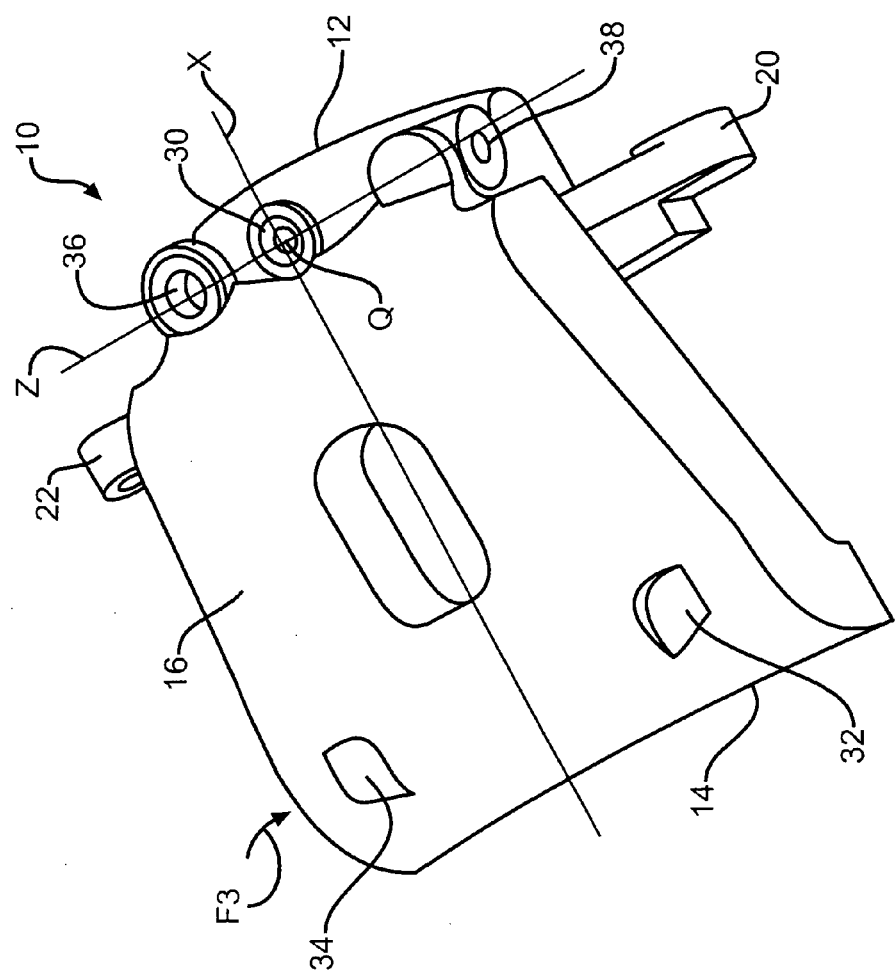
FIG. 1 is a perspective view of a first embodiment of a prior art brake caliper.

Referring now to the drawings, there is illustrated in FIGS. 1-4 a prior art brake caliper, indicated generally at 10, adapted for use in a vehicle disc brake assembly. It should be noted that while this invention will be described and illustrated in conjunction with the particular prior art brake caliper structure disclosed herein, it will be appreciated that this invention may be used in conjunction with other brake caliper structures adapted for use in other kinds of vehicle disc brake assemblies.

Figure 4:
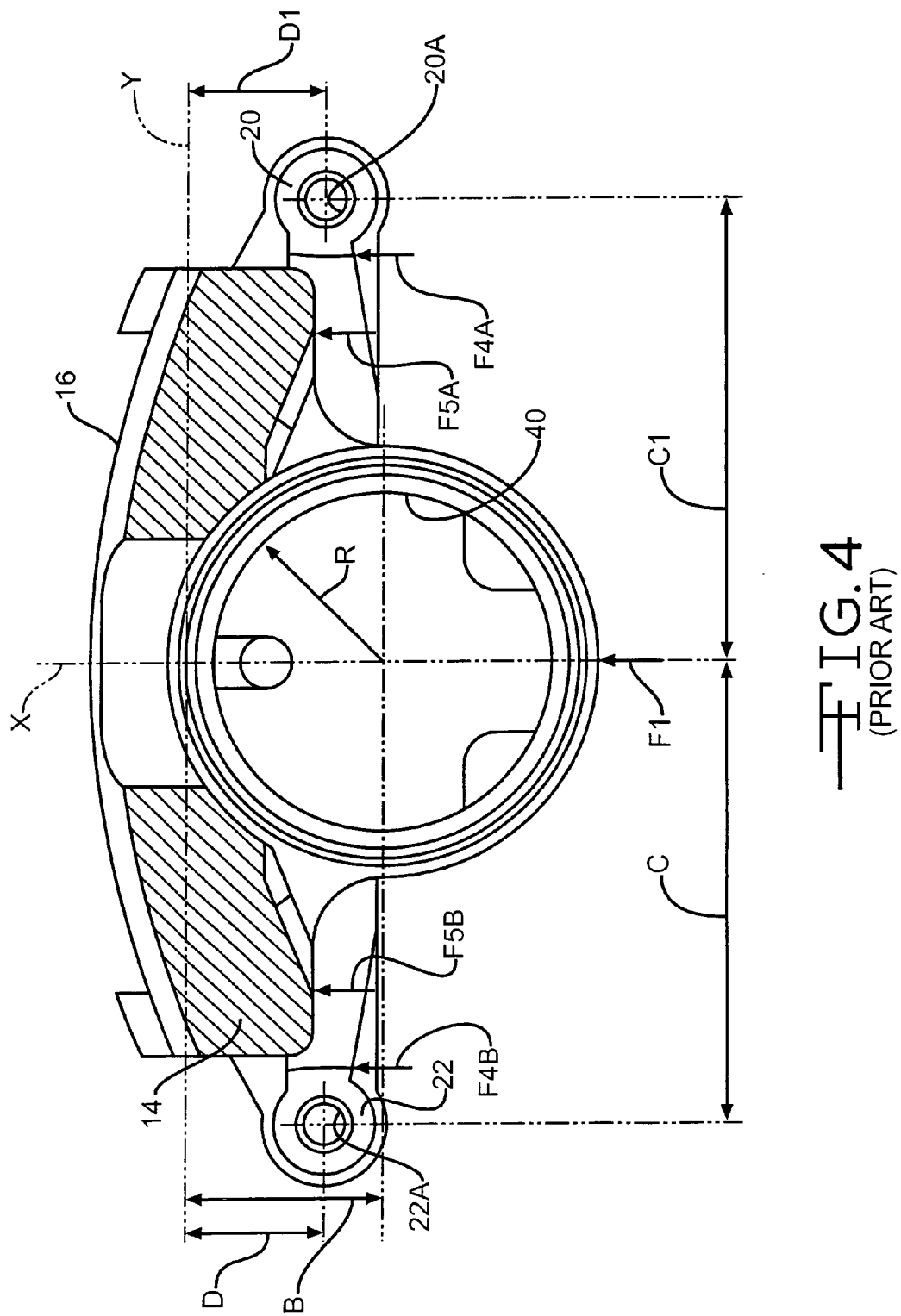
FIG. 4 is an inboard facing side view of the prior art brake caliper illustrated in prior art FIGS. 1-3.

The illustrated brake caliper 10 is adapted for use in a "Colette" type of disc brake assembly, such as that shown in U.S. Pat. No. 5,323,882 to Waterman et al. and U.S. Pat. No. Re 30,255 to Rath et al., the disclosures of both of these patents incorporated herein by reference. The prior art brake caliper 10 is a generally C-shaped single-pot brake caliper and includes an inboard leg portion 12 and an outboard leg portion 14 which are interconnected by an intermediate bridge portion 16. The inboard leg 12 of the prior art brake caliper 10 includes a pair of ears 20 and 22. As best shown in FIG. 4, the ear 20 includes an opening 20A formed therethrough, and the ear 22 includes an opening 22A formed therethrough. In the illustrated embodiment, the openings 20A and 22A are non-threaded or through holes and are adapted to receive a portion of a slide pin bolt (not shown) for supporting the brake caliper 10 for sliding movement during actuation thereof in a known manner. The prior art brake caliper 10 is formed from any suitable castable material, such as for example, iron, aluminum and alloys thereof.

Figure 2:
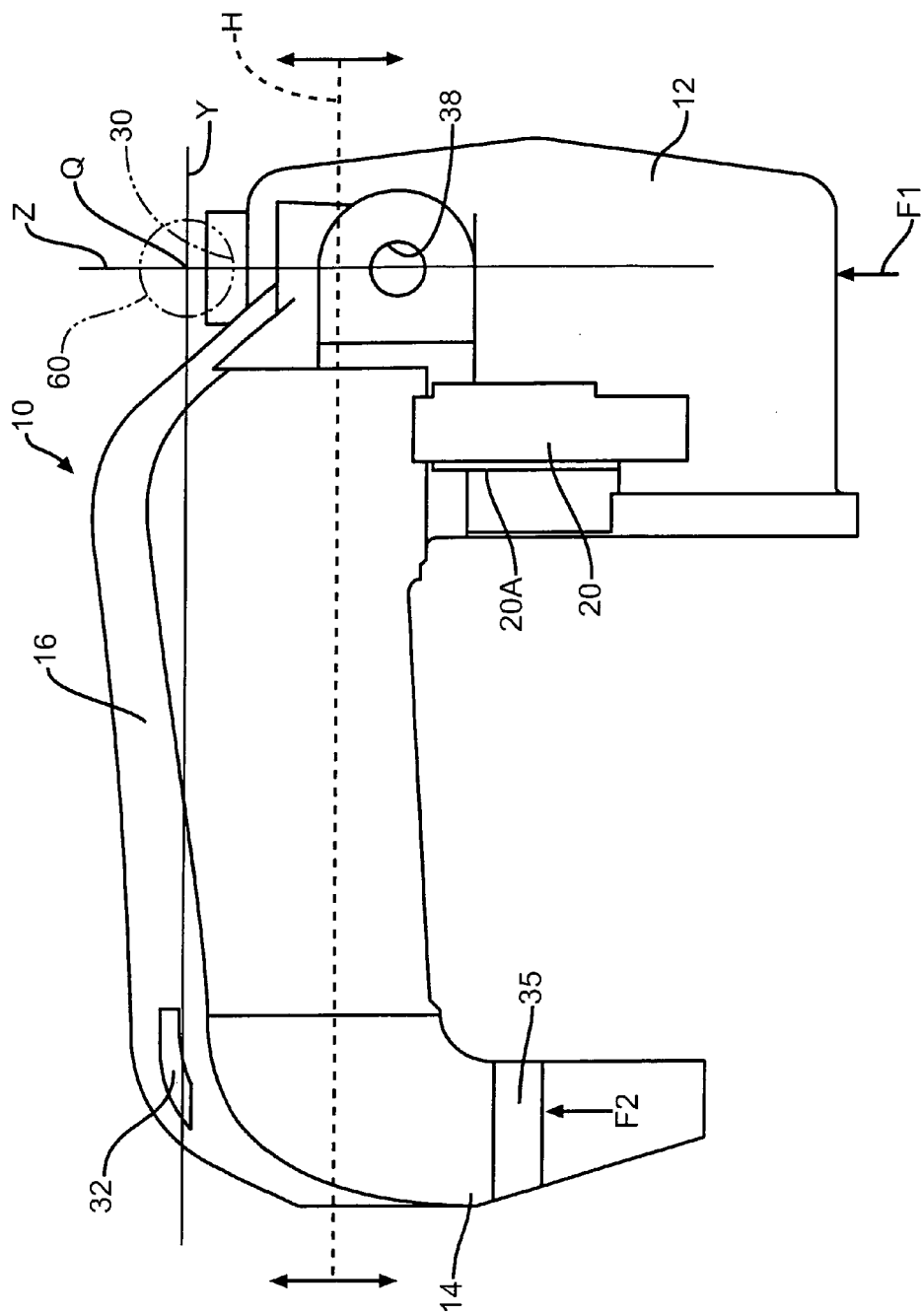
FIG. 2 is a side view of the prior art brake caliper illustrated in prior art FIG. 1.
Figure 3:
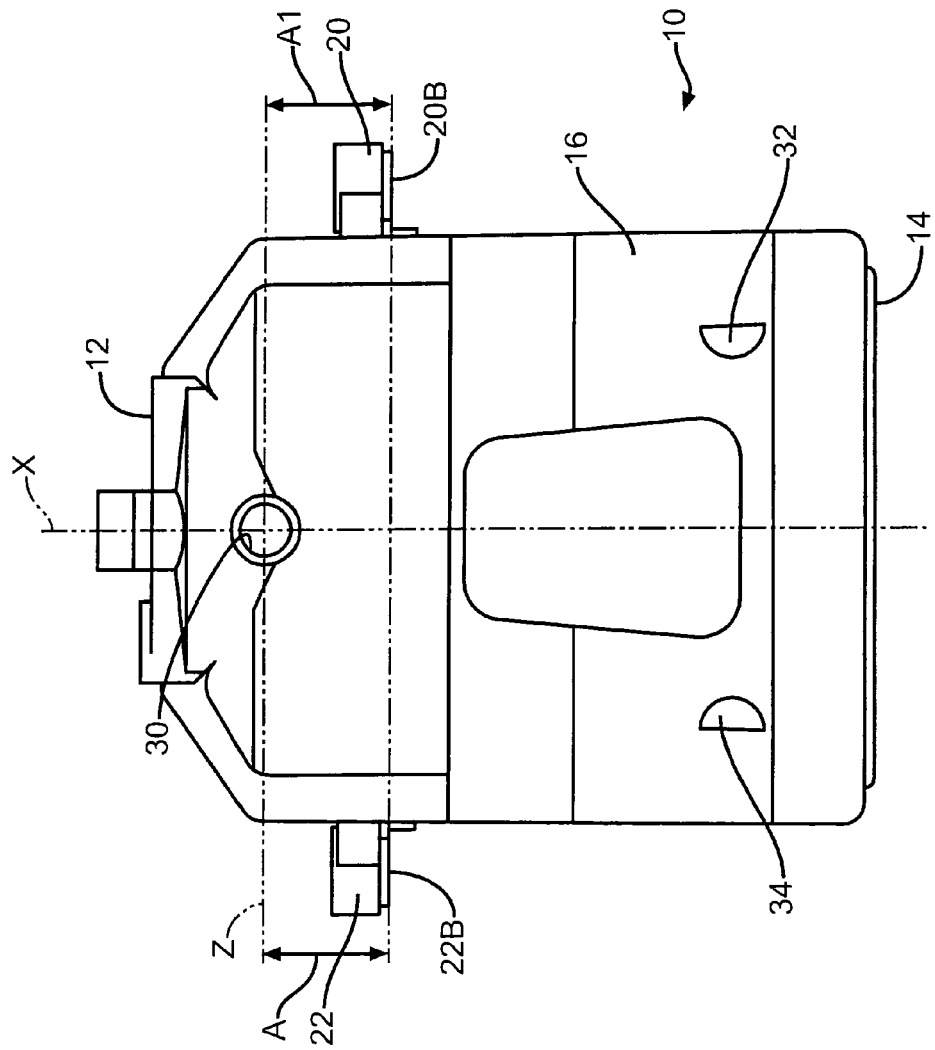
FIG. 3 is a top view of the prior art brake caliper illustrated in prior art FIGS. 1 and 2.

The prior art brake caliper 10 further includes a recess 30 and a pair of first surfaces 32 and 34 and a pair of second surfaces (only one of the second pair of surfaces best shown at 35 in prior art FIG. 2), for a purpose to be discussed below. Preferably, the recess 30 is a generally conical-shaped closed recess, the surfaces 32 and 34 are generally flat surfaces, and the surfaces 35 are generally flat angled surfaces as shown in FIG. 2. Also, the recess 30 and the surfaces 32, 34 and 35 are preferably as cast surfaces accurately formed during the casting process to predetermined tolerances although slight cleaning or brushing of one or more of the recess 30 and the surfaces 32, 34 and 35 may occur subsequent to the casting process. The prior art brake caliper 10 further includes a fluid supply inlet port 36, a bleed port 38, and a piston bore 40 (partially shown in FIG. 2). Alternatively, the structure of the prior art brake caliper 10 can be other than illustrated if so desired.

Figure 5:
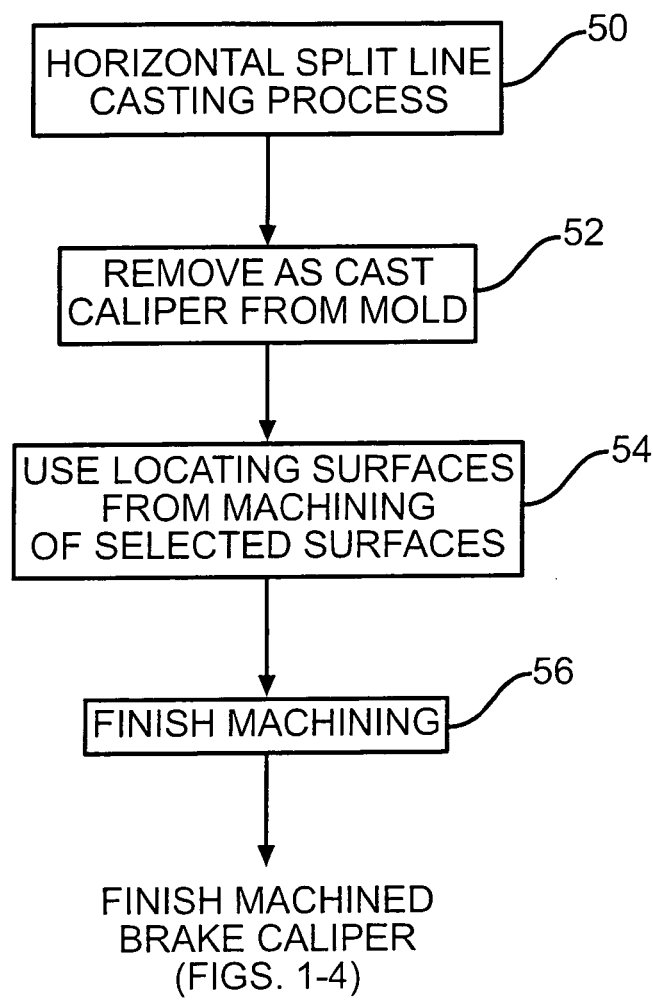
FIG. 5 is a block diagram showing a sequence of steps for producing either the first embodiment of the prior art brake caliper illustrated in prior art FIGS. 1-4 and/or the second embodiment of a prior art brake caliper illustrated in prior art FIGS. 6-12.
Figure 6:
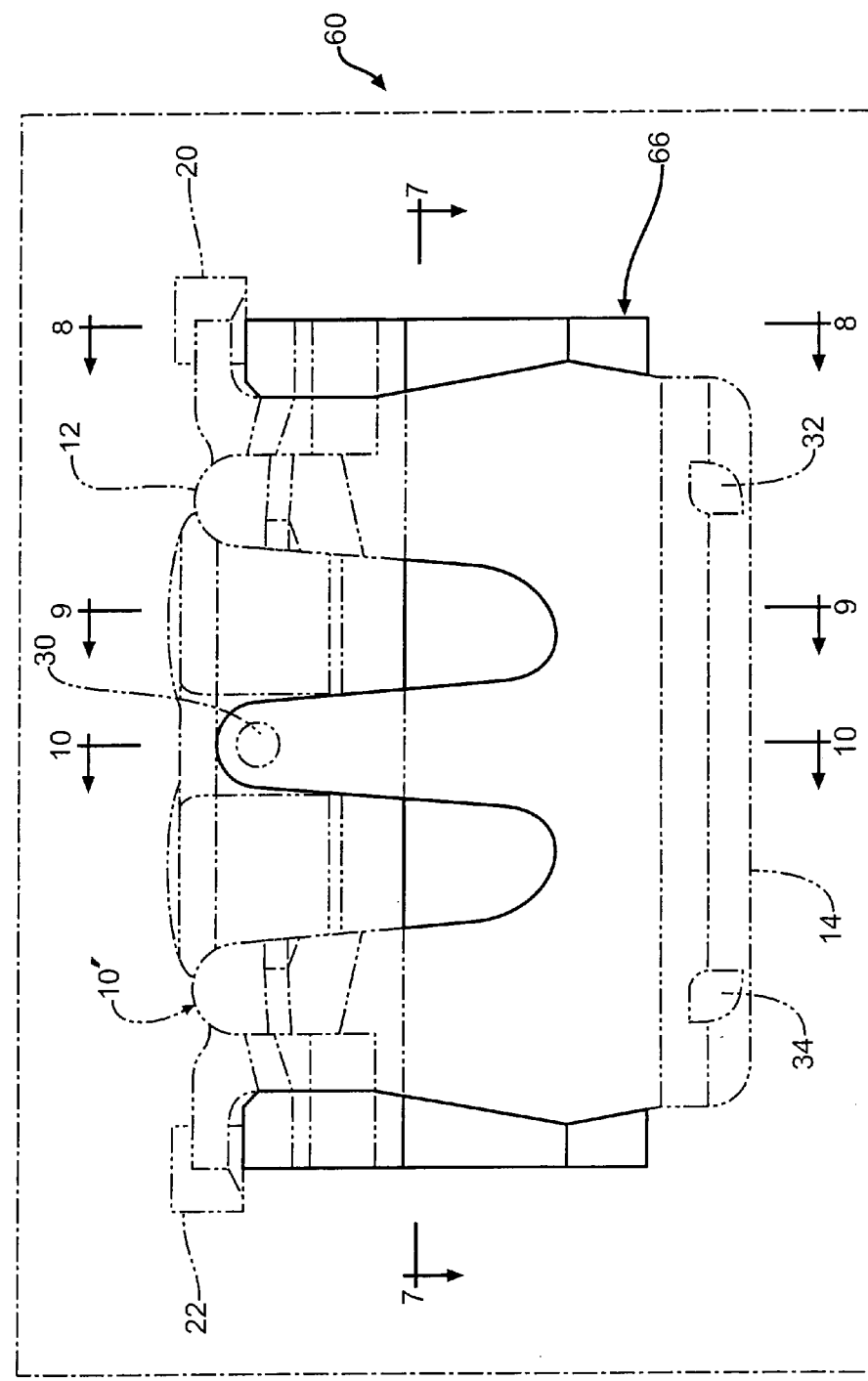
FIG. 6 is a top view of a portion of a prior art casting apparatus adapted for use in producing the prior art brake calipers, the second embodiment of the prior art brake caliper being illustrated.
Figure 7:
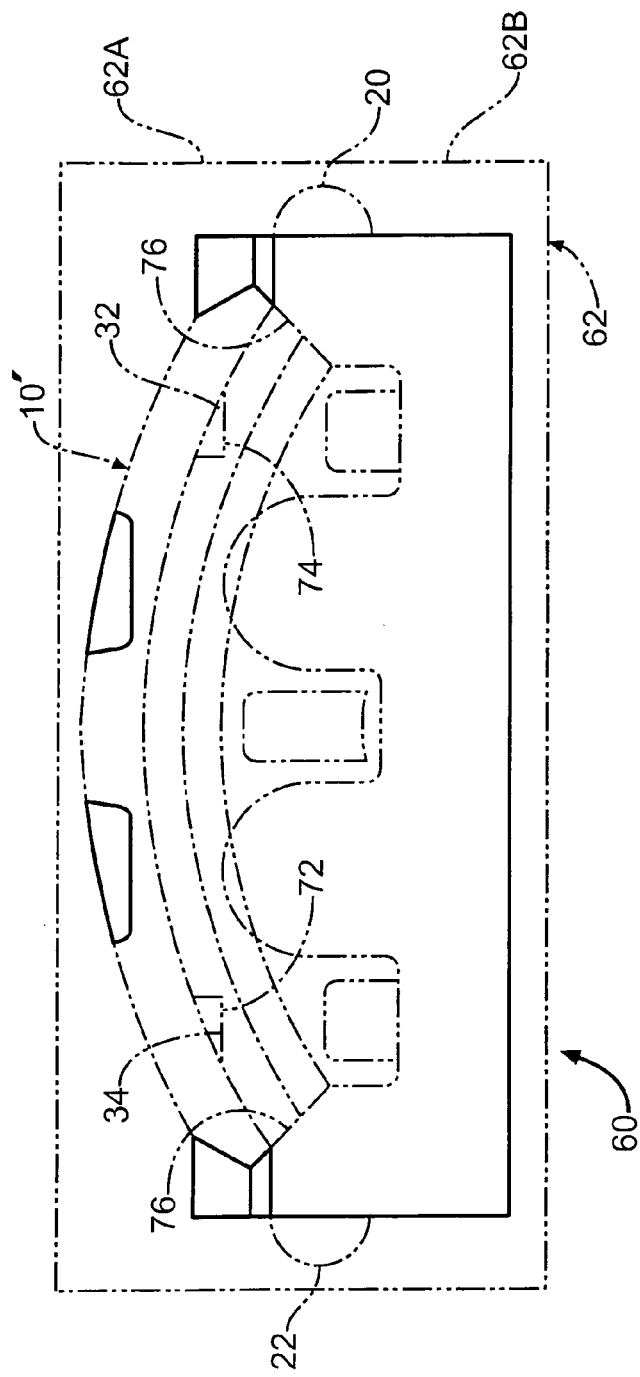
FIG. 7 is a sectional view taken along line 7-7 of prior art FIG. 6.
Figure 8:
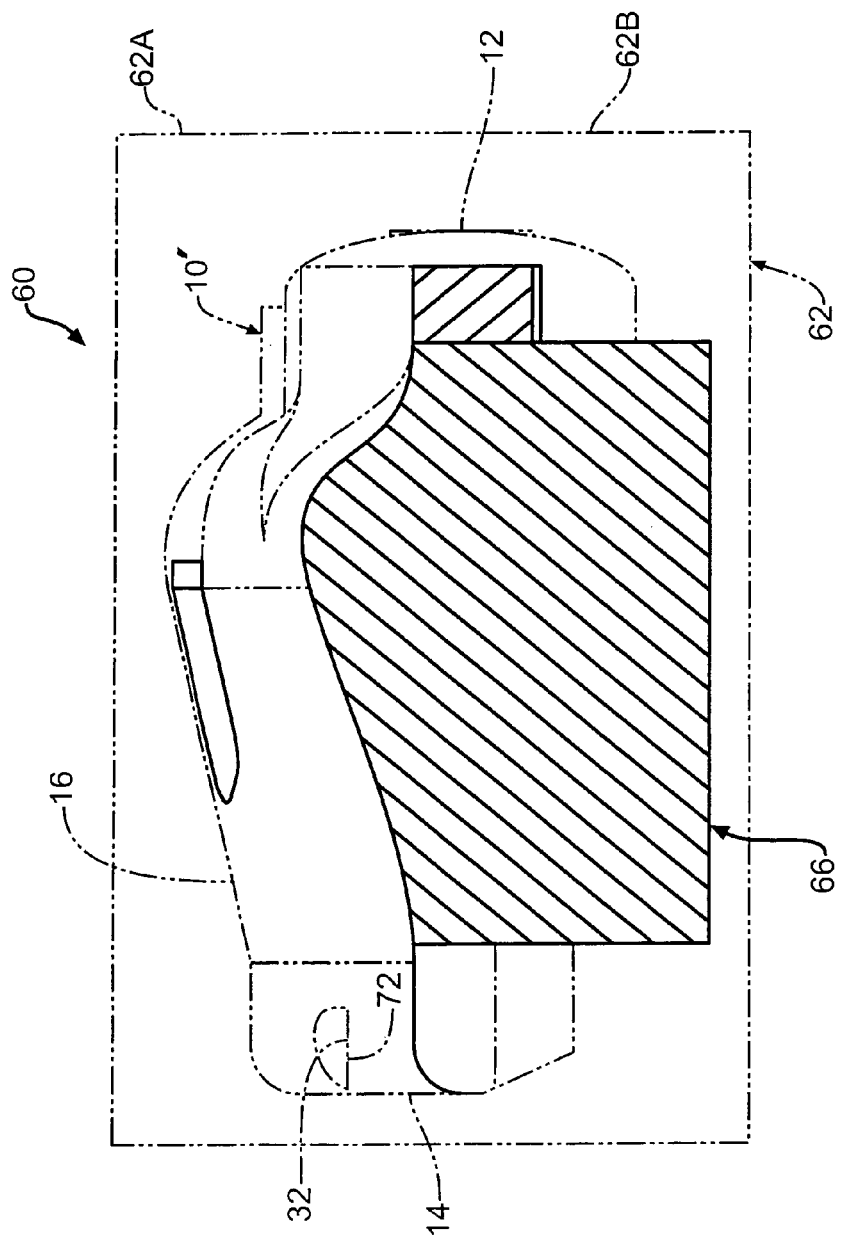
FIG. 8 is a sectional view taken along line 8-8 of prior art FIG. 6.
Figure 9:
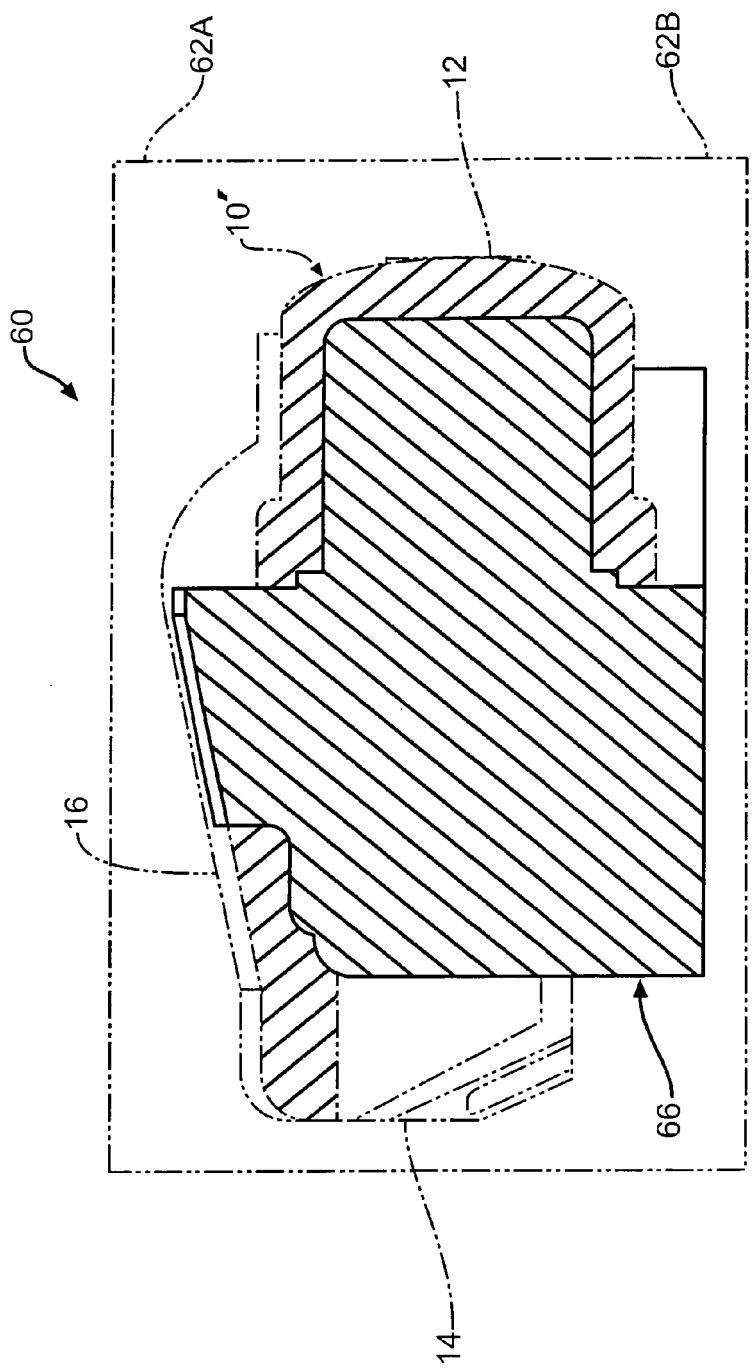
FIG. 9 is a sectional view taken along line 9-9 of prior art FIG. 6.

Referring now to prior art FIG. 5 and using the same reference characters to refer to corresponding parts, there is illustrated a block diagram showing a sequence of steps for producing a prior art brake caliper, indicated generally at 10' in prior art FIGS. 6-12, as being a prior art twin-pot piston brake caliper and shown in phantom or broken lines. The prior art brake caliper 10' is generally similar to the prior art brake caliper 10 except that it is a twin-pot caliper whereas the caliper 10 is a single-pot caliper. Thus, it is understood that the following process described below which is used to produce the prior art twin-pot brake caliper 10' also applies to the prior art single-pot brake caliper 10.

As shown therein, the prior art brake caliper 10' is produced in a casting apparatus, indicated generally at 60 in prior art FIGS. 6-12, during a known horizontal split line casting process during step 50. As used herein, the term horizontal split line casting process means that the prior art brake caliper 10' is produced using typically a mold 62 having two mold or pattern sections 62A and 62B which are disposed horizontally with respect to one another so as to produce a horizontal split line H, as shown in prior art FIGS. 2 and 6-12. In the illustrated embodiment, the mold section 62A defines an upper mold section and the mold section 62B defines a lower mold section 62B.

As shown in prior art FIGS. 6-12, the casting apparatus 60 includes a core member, indicated generally at 66 and shown in solid lines, disposed in the mold 62 in a predetermined position. The core member 66 is made of a suitable known material, such as for example, sand and resin, and the mold 62 is made of a suitable material, such as for example, sand and resin. Thus, it is understood that the core member 66 typically is a consumable or non-reusable member which can be used only one time in the casting process and that the mold 62 is a non-consumable or reusable member which can be used countless times over before it wears out.

Figure 10:
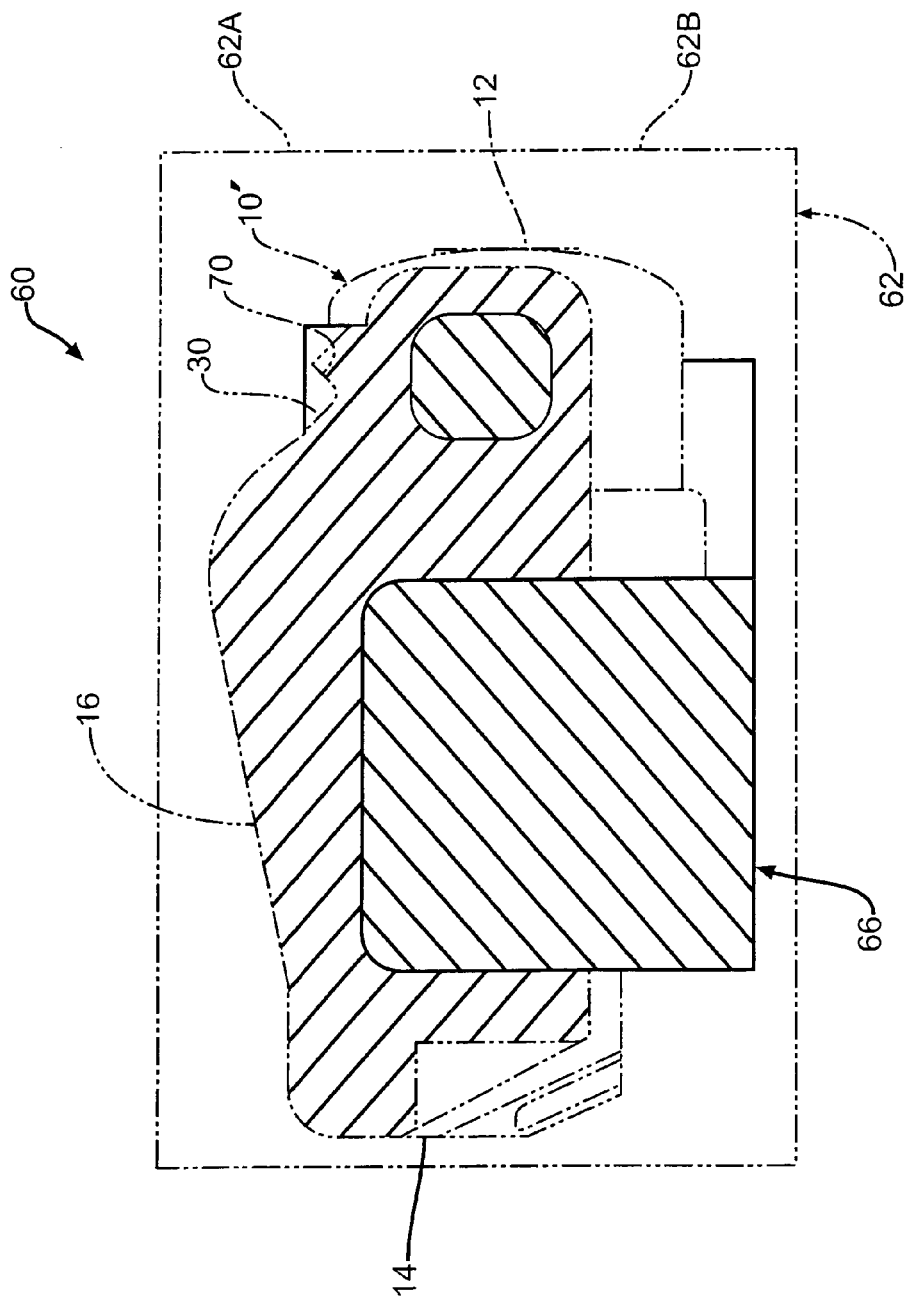
FIG. 10 is a sectional view taken along line 10-10 of prior art FIG. 6.
Figure 11:
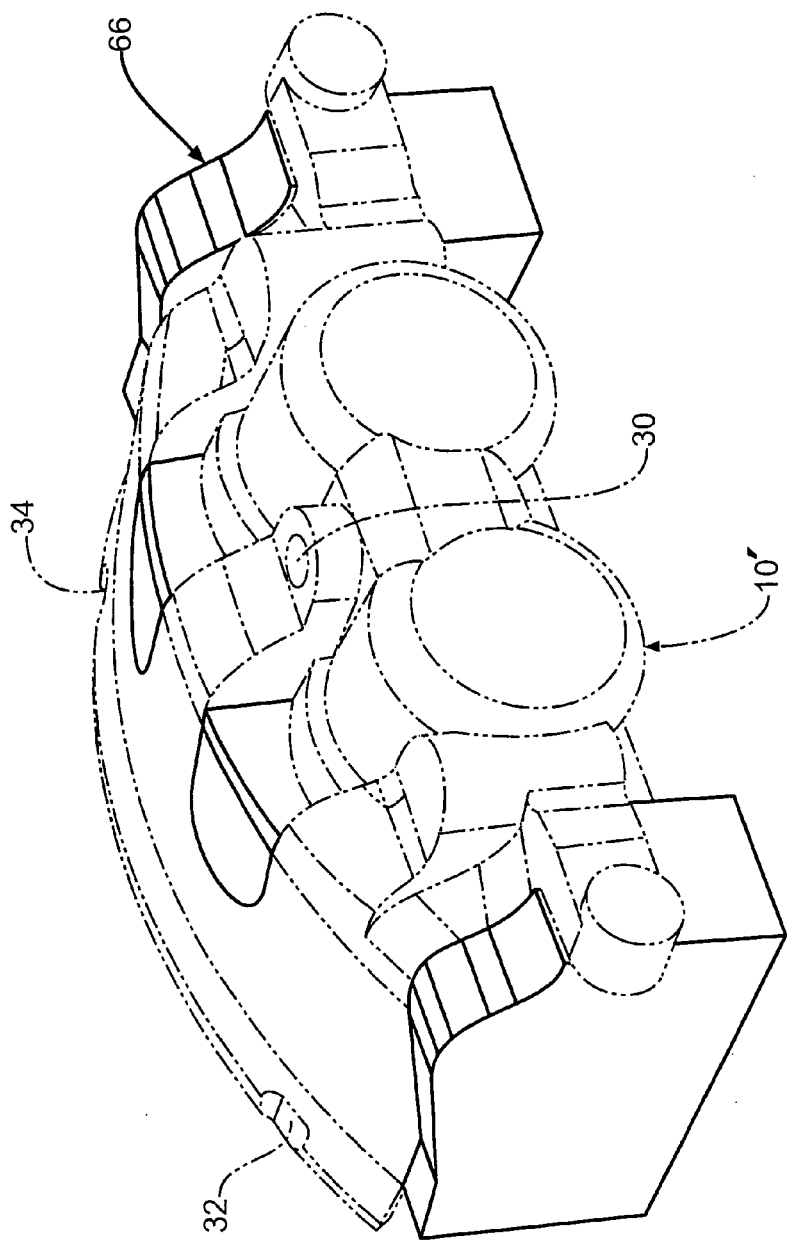
FIG. 11 is a perspective view of the prior art casting apparatus with the mold portion thereof not being shown.
Figure 12:
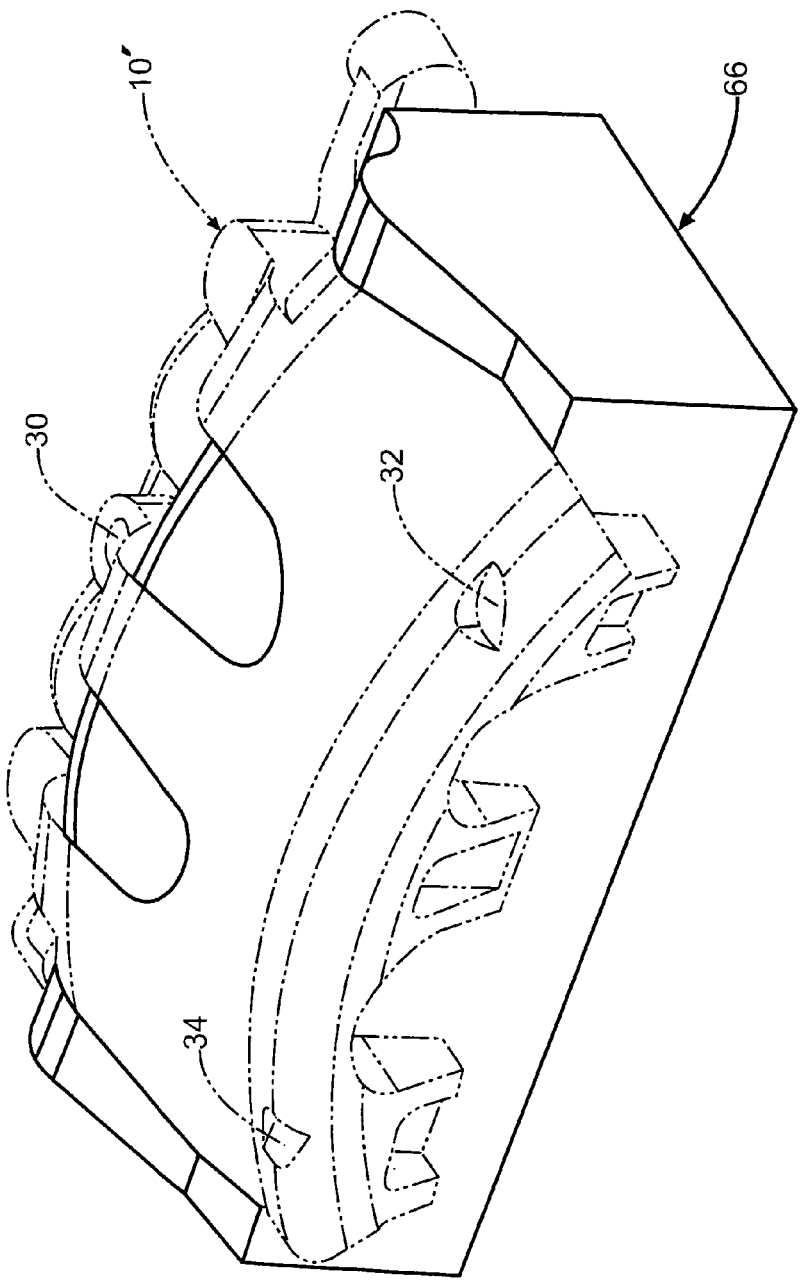
FIG. 12 is another perspective view of the prior art casting apparatus with the mold portion thereof not being shown.

As best shown in prior art FIG. 10, the upper mold section 62A of the mold 62 includes a first "male" extension or protuberance 70. The first extension 70 has a generally conical shape and is effective to produce the conical recess 30 in the prior art cast brake caliper 10'. Also, as best shown in prior art FIG. 7, the upper mold section 62A includes a pair of second male extensions or protuberances 72 and 74. The second extensions 72 and 74 have a generally triangular shaped cross section and are effective to produce the generally flat surfaces 32 and 34, respectively, on the prior art brake caliper 10'. In addition, as best shown in prior art FIG. 7, the lower mold section 62B includes a pair of angled surfaces 76. The surfaces 76 are effective to produce the angled surfaces 35 on the prior art brake caliper 10.

Next, the "as cast" prior art brake caliper 10 or 10' is removed from the casting apparatus during step 52. As discussed above, the as cast prior art brake caliper 10 or 10' includes the conical recess 30 and the flat surfaces 32 and 34.

Following this, selected surfaces of the as cast prior art brake caliper 10 or 10' are machined to predetermined tolerances using a known machining apparatus (not shown) during step 54. To accomplish this, the conical recess 30 and the surfaces 32 and 34 are used as datum or locating surfaces. In particular, a suitable locating member, such as a predetermined sized ball 60 (shown in phantom in FIG. 2 in conjunction with the prior art brake caliper 10), is disposed in the conical recess 30 and a first clamp member (not shown), which is operative to clamp and apply a first force F1 to a selected surface of the inboard leg portion 12 of the caliper 10 or 10' to hold the ball 60 in the recess 30, and a second clamp member (not shown), which is operative to clamp and apply a second force F2 to a selected surface of the outboard leg 14 of the caliper 10 or 10', are used to define a first vertical plane Z of the as cast brake caliper 10 or 10'. Next, the ball 60 and the surfaces 32 and 34 are used to define a second horizontal plane Y of the as cast brake caliper 10 or 10'. Following this, the ball 60 and a third clamp member (not shown), which is operative to clamp and apply a third force F3 on the brake caliper 10 or 10' at a generally opposite location to one of the clamping surfaces 35 provided on a side portion of the outboard leg portion 12, are used to define a third vertical plane X of the as cast brake caliper 10 or 10'. Alternatively, other suitable methods can be used to hold or clamp the caliper 10 or 10' to enable the surfaces 30, 32, 34 and 35 to be used as locating surfaces to determine the planes X, Y and Z. For example, forces other than those already described and/or in addition to can be applied to the caliper 10 or 10' at the following locations: forces F4A and F4B can be applied to the caliper ears 20 and 22, respectively, as shown in prior art FIG. 4 and/or forces F5A and F5B can be applied to the outboard leg portion 14 of the caliper 10 or 10', also shown in prior art FIG. 4.

In the illustrated embodiment, the X plane and the Z plane bisect one another in a generally perpendicular manner. And in the illustrated embodiment, the Y plane and the Z plane bisect one another in a generally perpendicular manner. Alternatively, the orientation of one or more of the three planes X, Y and Z can be other than illustrated if so desired. Also, as shown in prior art FIGS. 1 and 2, a common point Q is defined by the intersection of the three planes X, Y and Z.

Once the above described three planes X, Y and Z of the horizontal split line as cast brake caliper 10 or 10' have been established and with the forces F1, F2 and F3 applied, selected surfaces of the brake caliper 10 or 10' are machined to predetermined tolerances. In the illustrated embodiment, the selected surfaces include the machining of ears 20 and 22 and the machining of a rough cast piston bore 40. In particular, as shown in prior art FIG. 3, an outer surface 22B of the ear 22 is machined a predetermined distance A relative to the Z axis so as to define a flat outer surface which is in parallel relationship with the Z axis. Similarly, an outer surface 20B of the ear 20 is machined a predetermined distance A1 relative to the Z axis so as to define a flat outer surface which is in parallel relationship with the Z axis. In the illustrated embodiment, the distances A and A1 are the same.

Also, as shown in prior art FIG. 4, the opening 22A is machined a predetermined distance C with respect to the X axis and a predetermined distance D with respect to the Y axis. Similarly, the opening 20A is machined a predetermined distance C1 with respect to the X axis and a predetermined distance D1 with respect to the Y axis. In the illustrated embodiment, the distances C and C1 are the same and the distances D and D1 are the same. In addition, as shown in prior art FIG. 4, the piston bore 40 is machined along the X axis a predetermined distance B with respect to the Y axis so as to define a piston bore radius R. Following this, in step 56, other selected surfaces of the prior art brake caliper 10 are machined to predetermined tolerances to produce the finish machined prior art brake caliper 10 or 10'. To accomplish this, one or more of the surfaces 20B and 22B, the apertures 20A and 22A, and the piston bore 40 are used as datum points to carry out the finish machining of the brake caliper 10 or 10' during step 56. The structure and method for producing the prior art brake caliper 10 or 10' thus far described and illustrated is conventional in the art.

Turning now to FIGS. 13-16, there is illustrated a first embodiment of a brake caliper, indicated generally at 100, produced in accordance with the present invention. It should be noted that while this invention will be described and illustrated in conjunction with the particular brake caliper structure disclosed herein, it will be appreciated that this embodiment and the other embodiments of this invention may be used in conjunction with other brake caliper structures adapted for use in other kinds of vehicle disc brake assemblies. For example, the various embodiments of the invention may be used in conjunction with opposed or non-opposed piston types of disc brake assemblies having one or more than one associated brake pistons. The brake caliper 100 of the present invention, along with the other embodiments described herein, is formed from any suitable castable material, such as for example, iron, aluminum and alloys thereof.

The illustrated brake caliper 100 is adapted for use in a "Colette" type of disc brake assembly and is a generally C-shaped twin-pot brake caliper. The brake caliper 100 includes an inboard leg portion 112 and an outboard leg portion 114 which are interconnected by an intermediate bridge portion 116. The inboard leg 112 of the brake caliper 100 includes a pair of ears 120 and 122. Each of the ears 120 and 122 includes an opening 120A and 122A, respectively, formed therethrough. The openings 120A and 122A are adapted to receive a portion of a slide pin bolt (not shown) for supporting the brake caliper 100 for sliding movement during actuation thereof in a known manner. In the illustrated embodiment, the openings are non-threaded or through holes. However, the openings can be threaded holes depending upon the particular vehicle disc brake assembly design.

Figure 13:
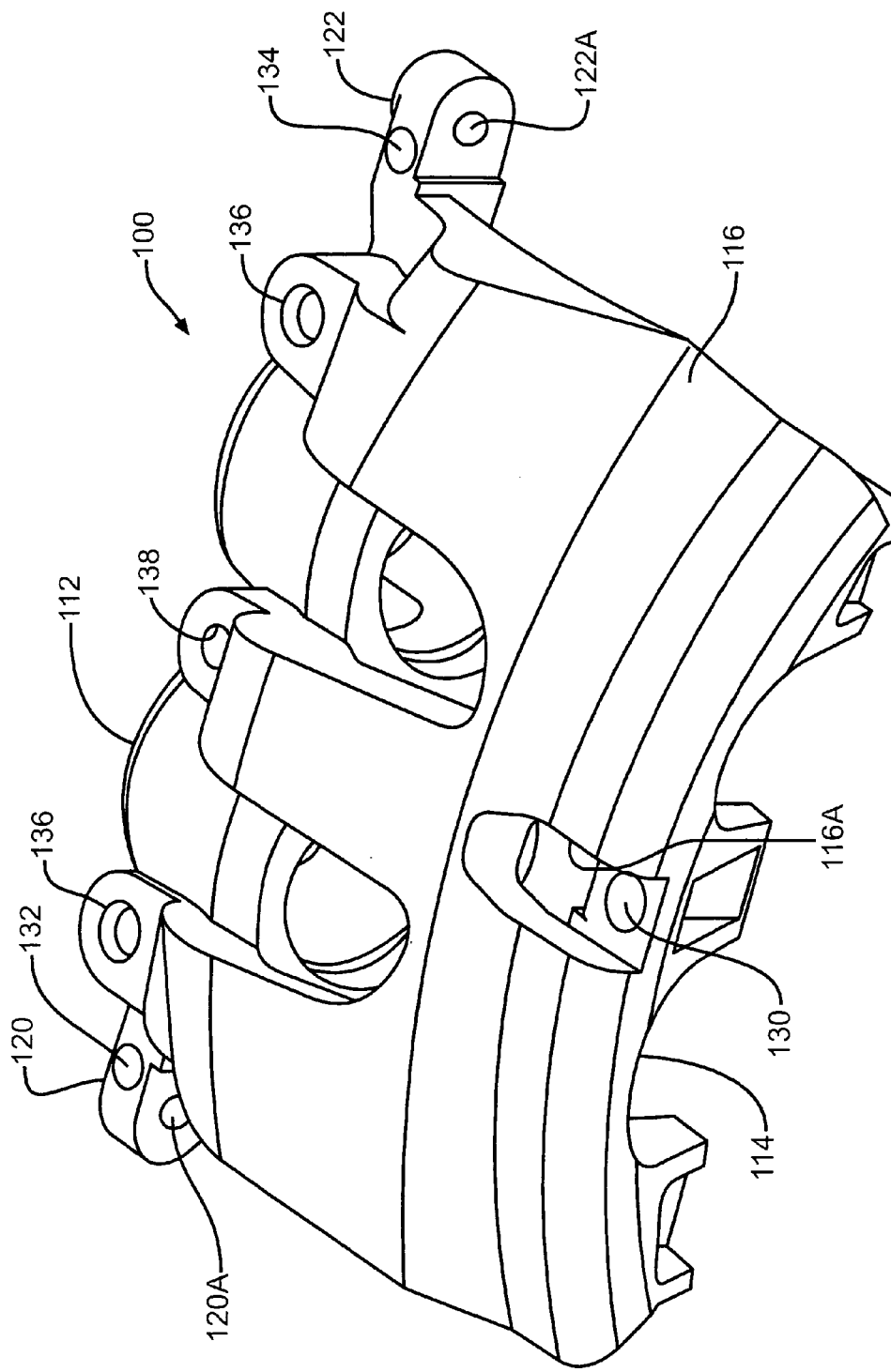
FIG. 13 is a perspective view of a first embodiment of a brake caliper produced in accordance with the present invention.
Figure 15:
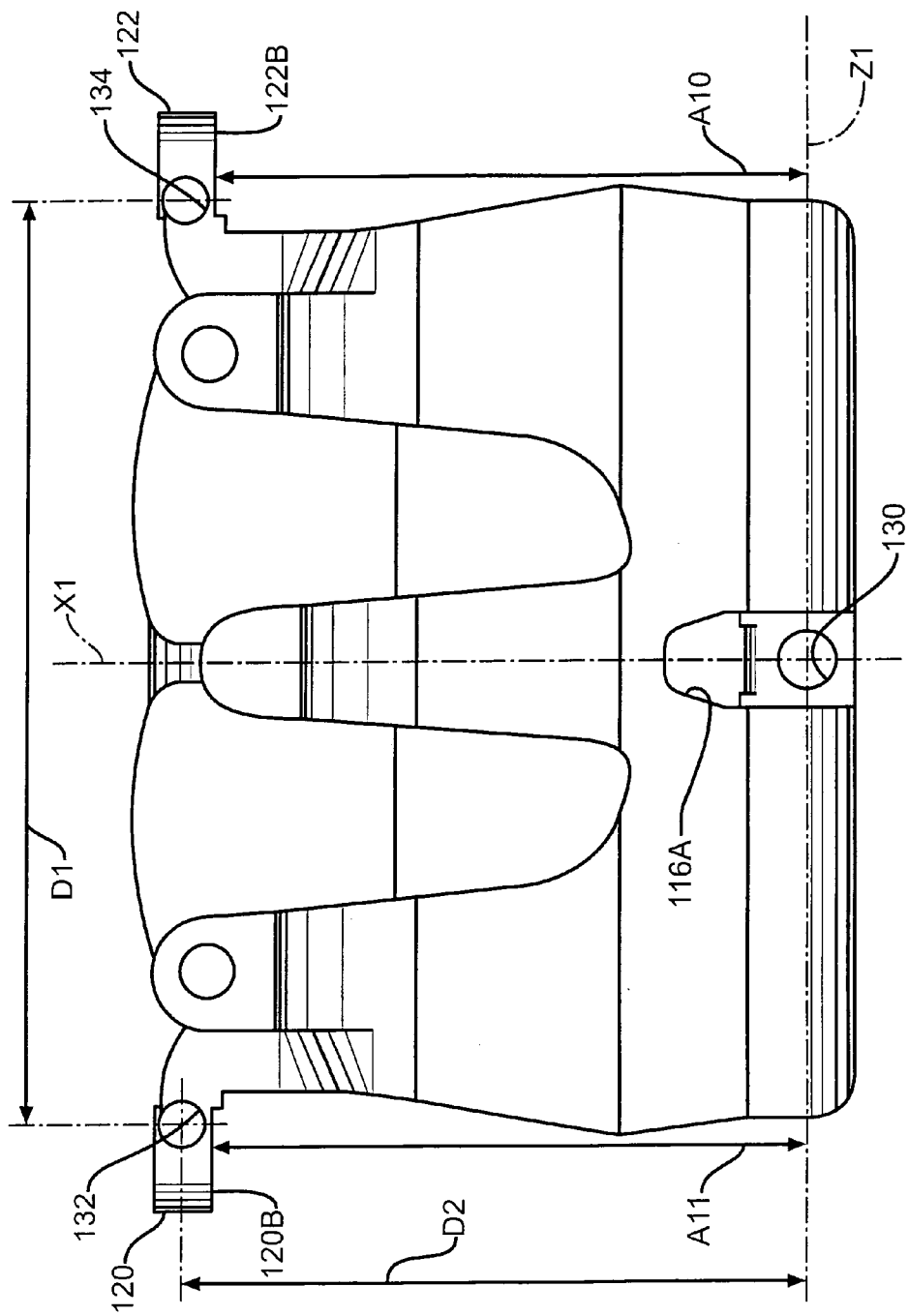
FIG. 15 is a top view of the first embodiment of the brake caliper of the present invention.

The brake caliper 100 further includes a recess 130, a first pair of surfaces 132 and 134, and second pair of surfaces 146 and 148 for a purpose to be discussed below. In the illustrated embodiment, the recess 130 is preferably a generally conical-shaped closed recess, the surfaces 132 and 134 are preferably generally flat surfaces, and the surfaces 146 and 148 are preferably generally angled flat surfaces which in this embodiment have a generally V-shape. Also, the recess 130 and the surfaces 132, 134, 146 and 148 are preferably as cast surfaces accurately formed during the casting process although slight cleaning or brushing of one or more of the recess 130 and the surfaces 132, 134, 146 and 148 may occur subsequent to the casting process. Also, for discussion purposes, the surfaces 132 and 134 are shown in FIGS. 13 and 15 as being round surfaces but actually the surfaces 132 and 134 are not round nor visibly distinct or different from the adjacent surface of the caliper in that portion thereof.

The brake caliper 100 further includes a pair of fluid supply inlet ports 136, a common bleed port 138, and a pair of piston bores 140. Alternatively, the structure of the brake caliper 100 can be other than illustrated if so desired. For example, the particular shape of the recess 130 of the brake caliper 100 could be any other suitable shape for a purpose to be discussed below.

Figure 17:
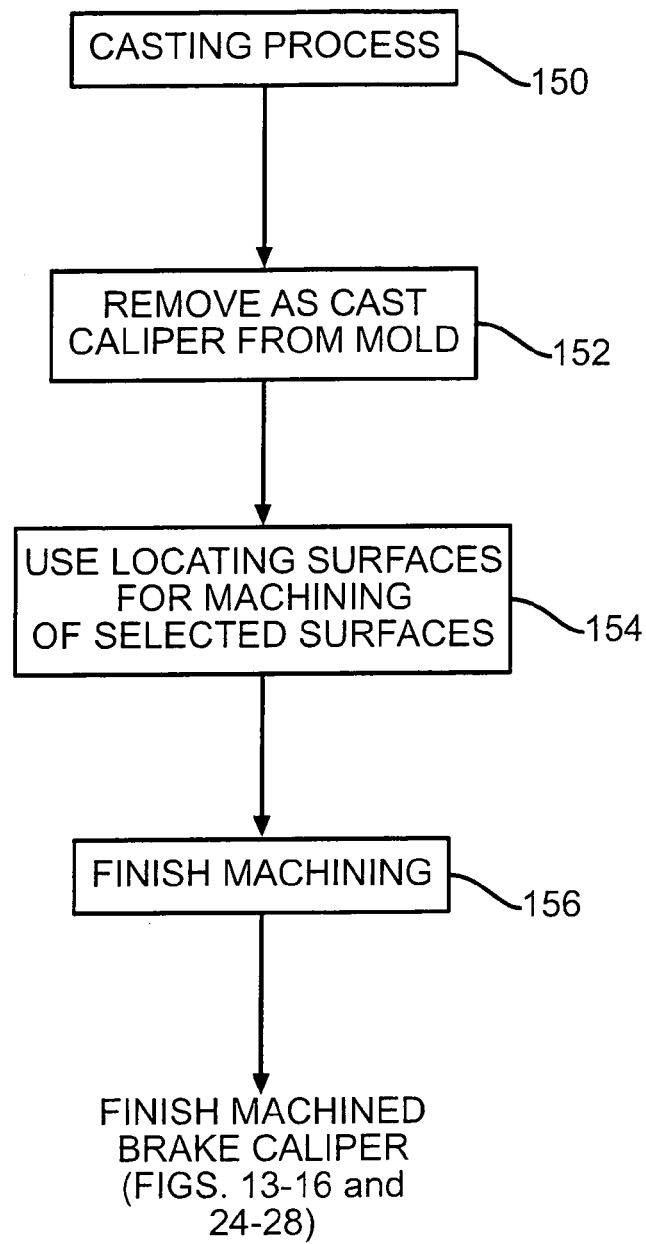
FIG. 17 is a block diagram showing a sequence of steps for producing the various embodiments of the brake caliper of the present invention illustrated in FIGS. 13-16 and 24-28.
Figure 18:
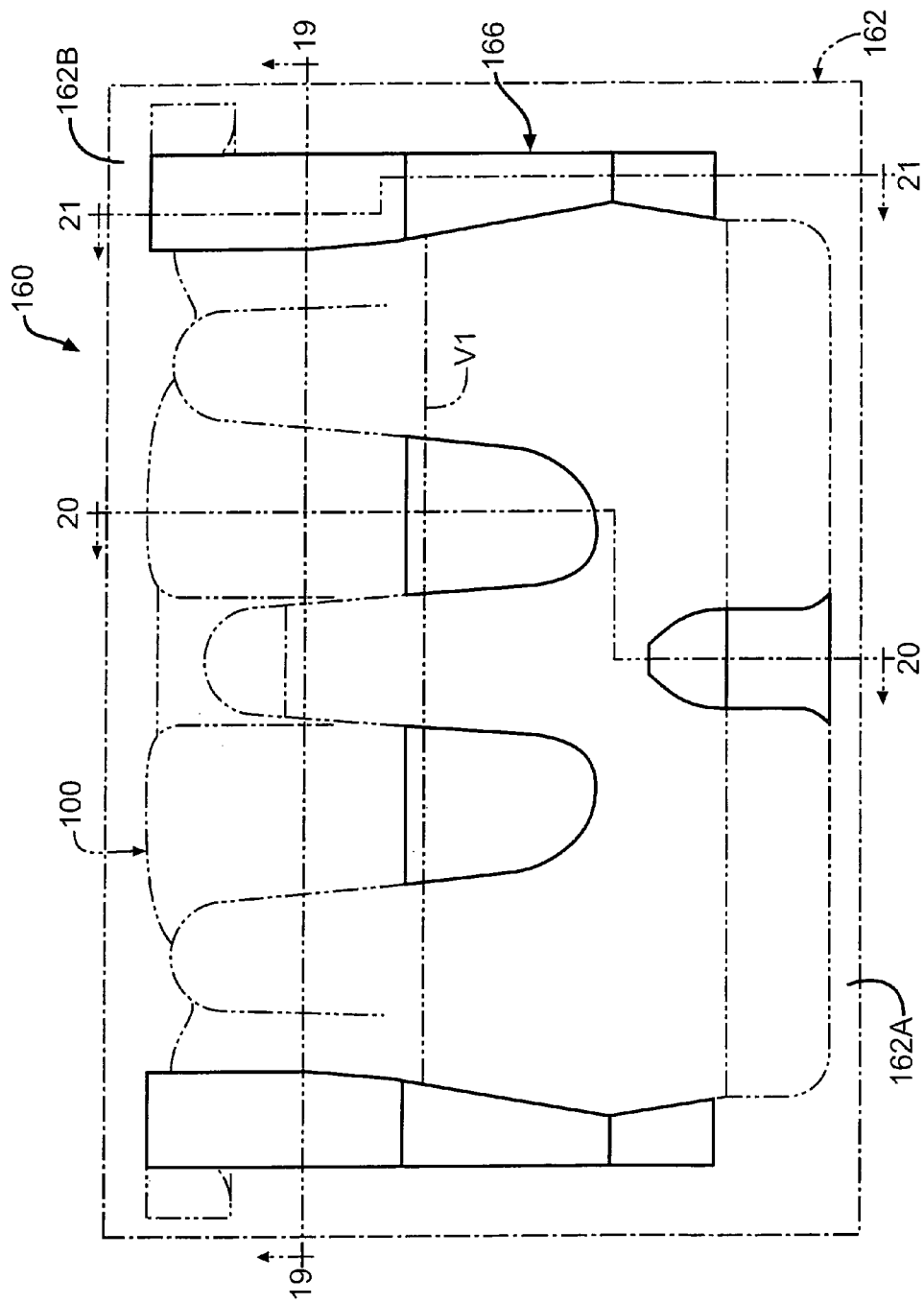
FIG. 18 is a top view of a portion of a casting apparatus according to the present invention adapted for use in producing the first embodiment of the brake caliper of the present invention.

Referring now to FIG. 17, there is illustrated a block diagram showing a sequence of steps for producing the various embodiments of the brake caliper of the present invention. By way of example, the first embodiment of the brake caliper 100 of the present invention is used to illustrate the method of the claimed invention. It should be appreciated by those of ordinary skill in the art that the described method may be used to produce the other various embodiments of the present invention. As shown therein, the first embodiment of the brake caliper 100 of this invention is illustrative of a brake caliper of the present invention produced in a casting apparatus, indicated generally at 160 in FIGS. 18-21, preferably during a vertical split line casting process during step 150. It should be further appreciated that the casting apparatus 160 described herein is generally applicable to the other various embodiments of the brake caliper of the present invention. Specific variations of casting apparatus feature shapes and relative locations are understood by those of ordinary skill in the art to correspond to the feature shapes and locations of the various embodiments of the present invention. To accomplish this in the illustrated embodiment, the casting process uses a mold 162 having two mold or pattern sections 162A and 162B which are disposed vertically with respect to one another so as to produce a vertical split, which is illustrated for discussions purposes by vertical split line V1 in FIGS. 18 and 21-23. In the illustrated embodiment, the mold section 162A defines a first side or outboard side mold section and the mold section 162B defines a second side or inboard side mold section 162B. Alternatively, the various embodiments of the brake caliper of this invention, as illustrated by the brake caliper 100, could be produced during a horizontal split line casting process if so desired.

As shown in FIGS. 18-21, the casting apparatus 160 includes a core member, indicated generally at 166 and shown in solid lines, disposed in the mold 162 in a predetermined position. The core member 166 is made of a known suitable material, such as for example, sand and resin, and the mold 162 is made of a suitable material, such as for example, sand and resin. Thus, it is understood that the core member 166 is a consumable or non-reusable member which can be used only one time in the casting process, and that the mold 162 is a non-consumable or reusable member which can be used countless times over before it wears out.

Figure 19:
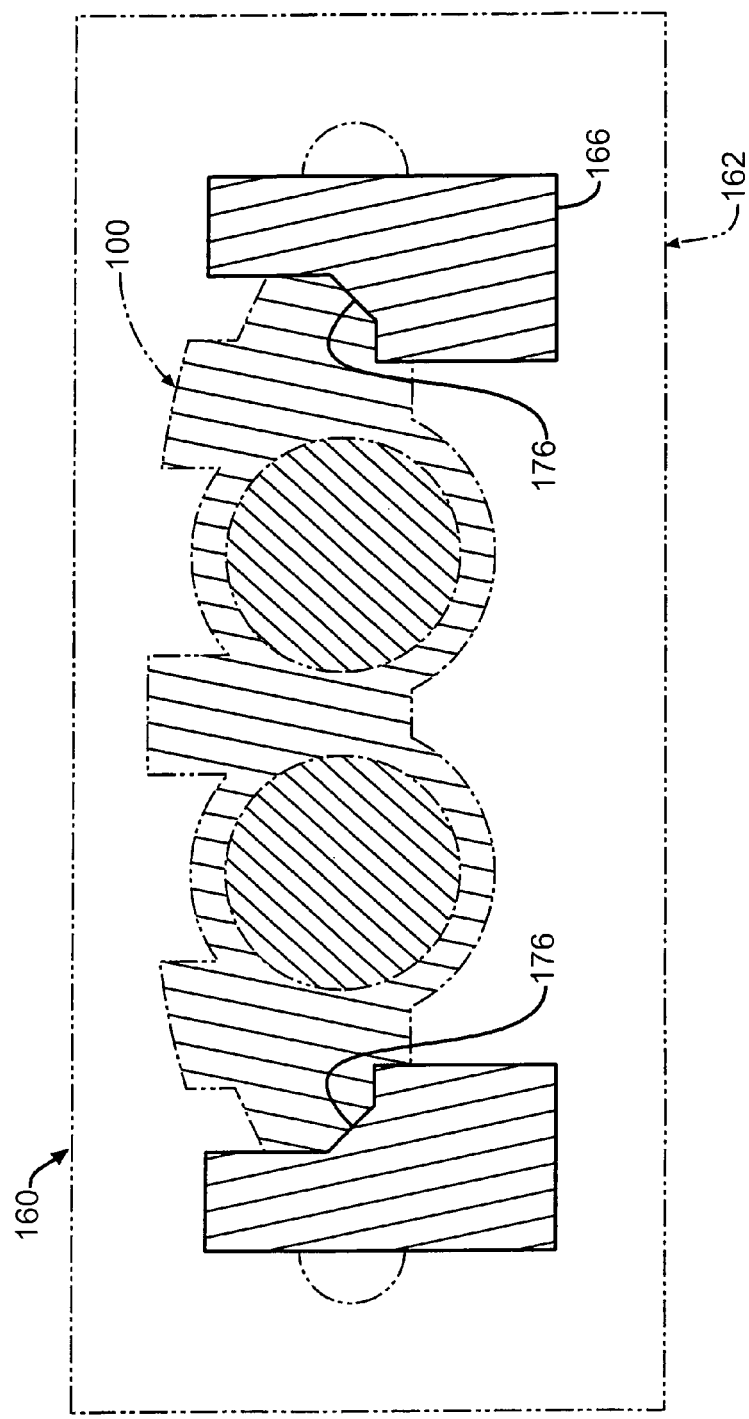
FIG. 19 is a sectional view taken along line 19-19 of FIG. 18.
Figure 20:
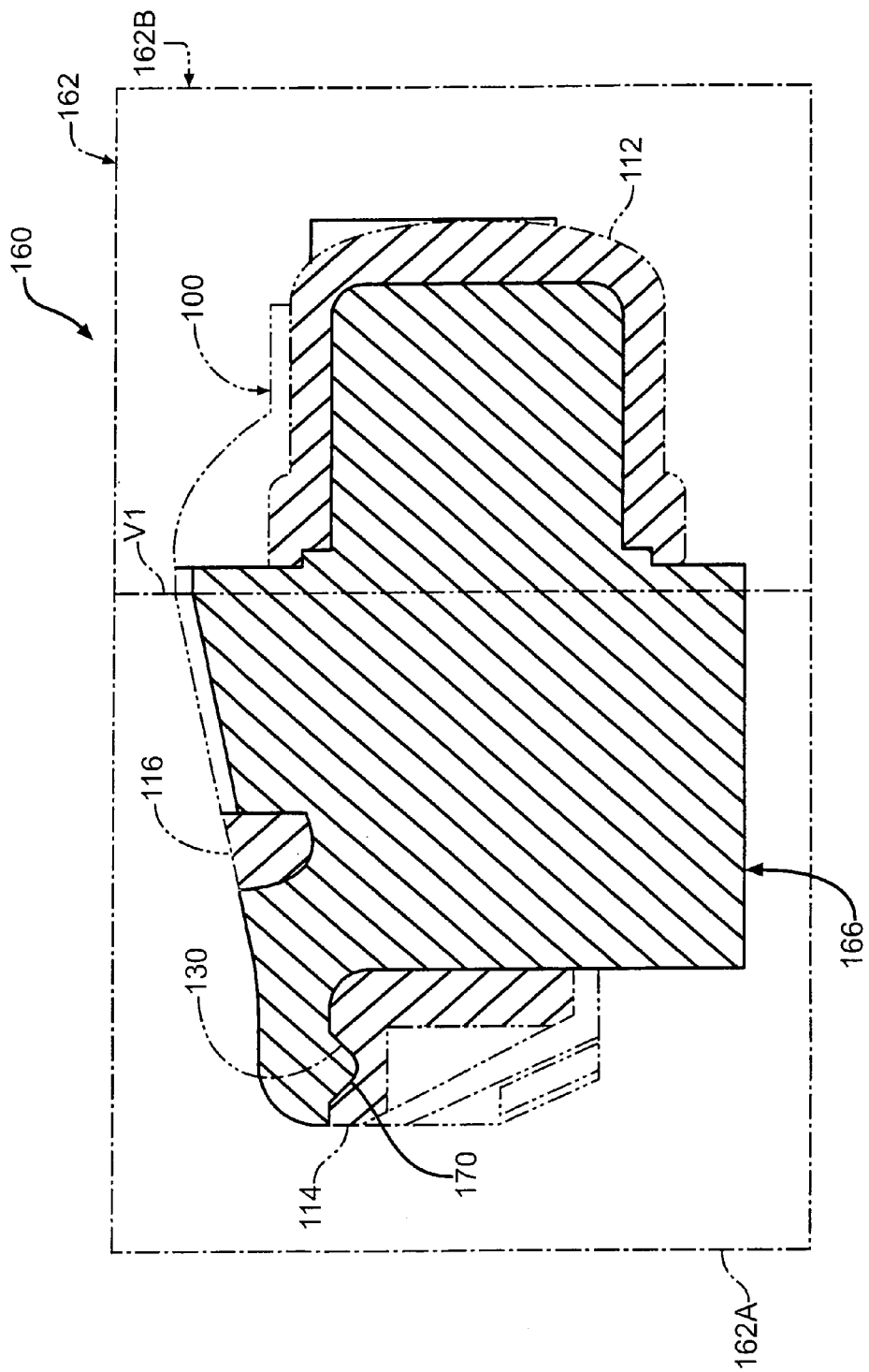
FIG. 20 is a sectional view taken along line 20-20 of FIG. 18.
Figure 21:
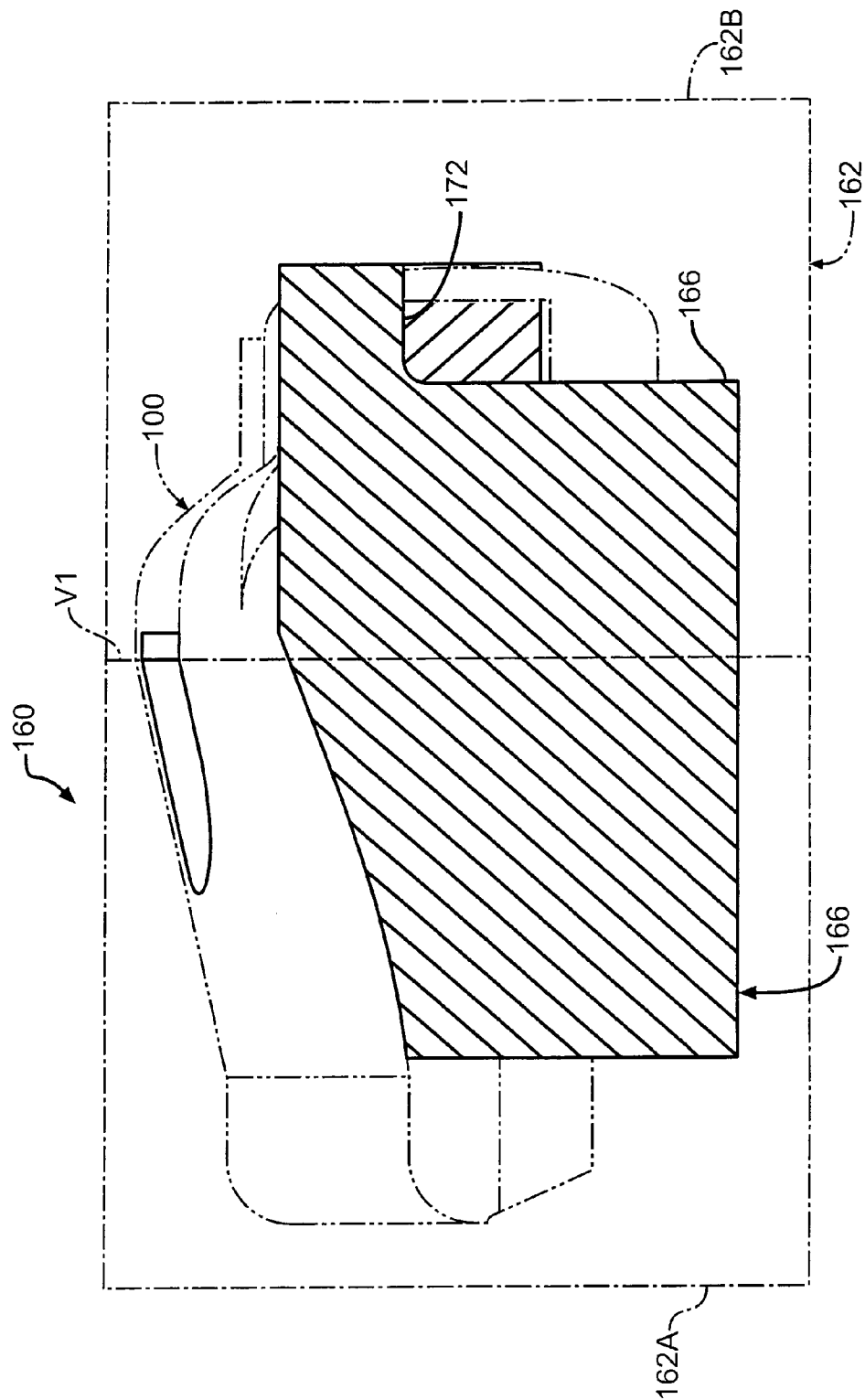
FIG. 21 is a sectional view taken along line 21-21 of FIG. 18.
Figure 22:
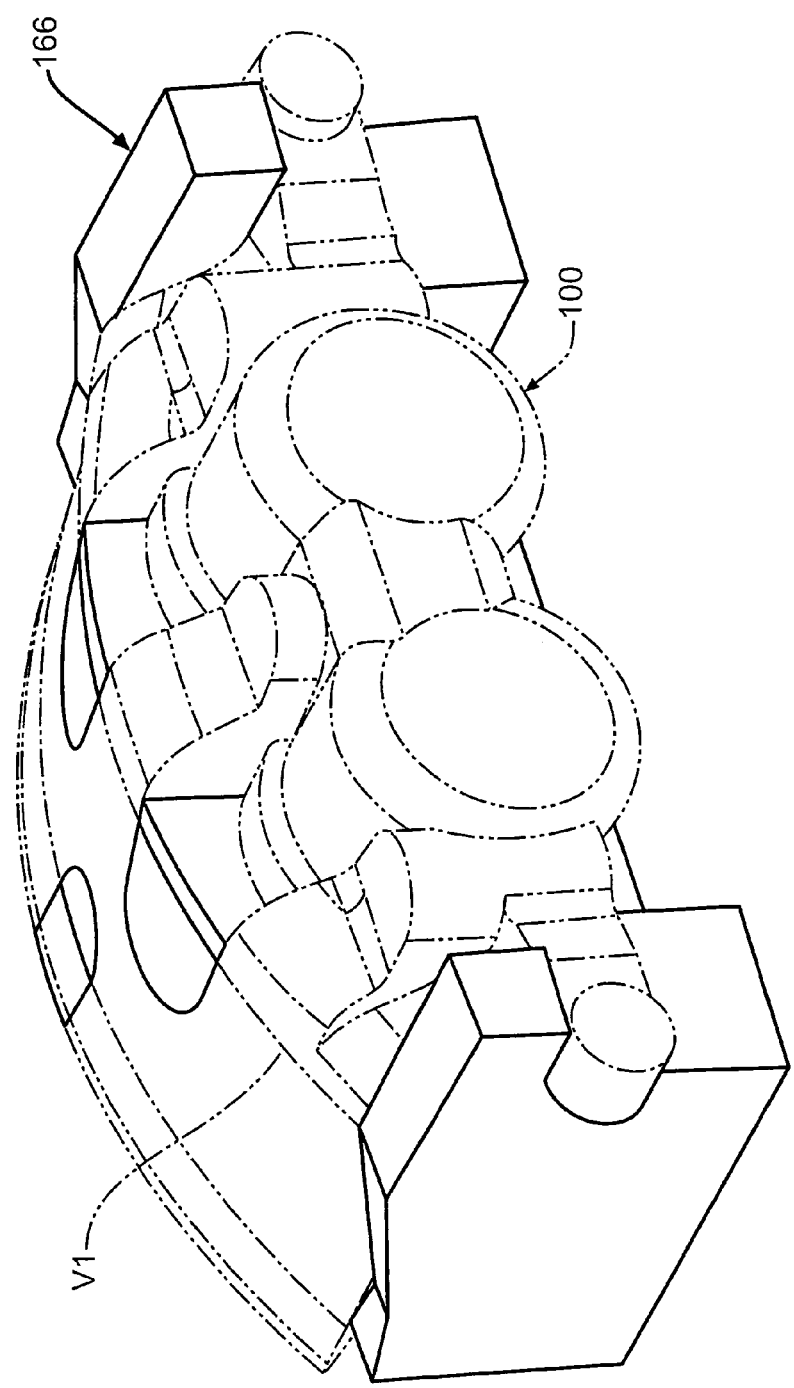
FIG. 22 is a perspective view of the casting apparatus according to the present invention with the mold portion thereof not being shown.
Figure 23:
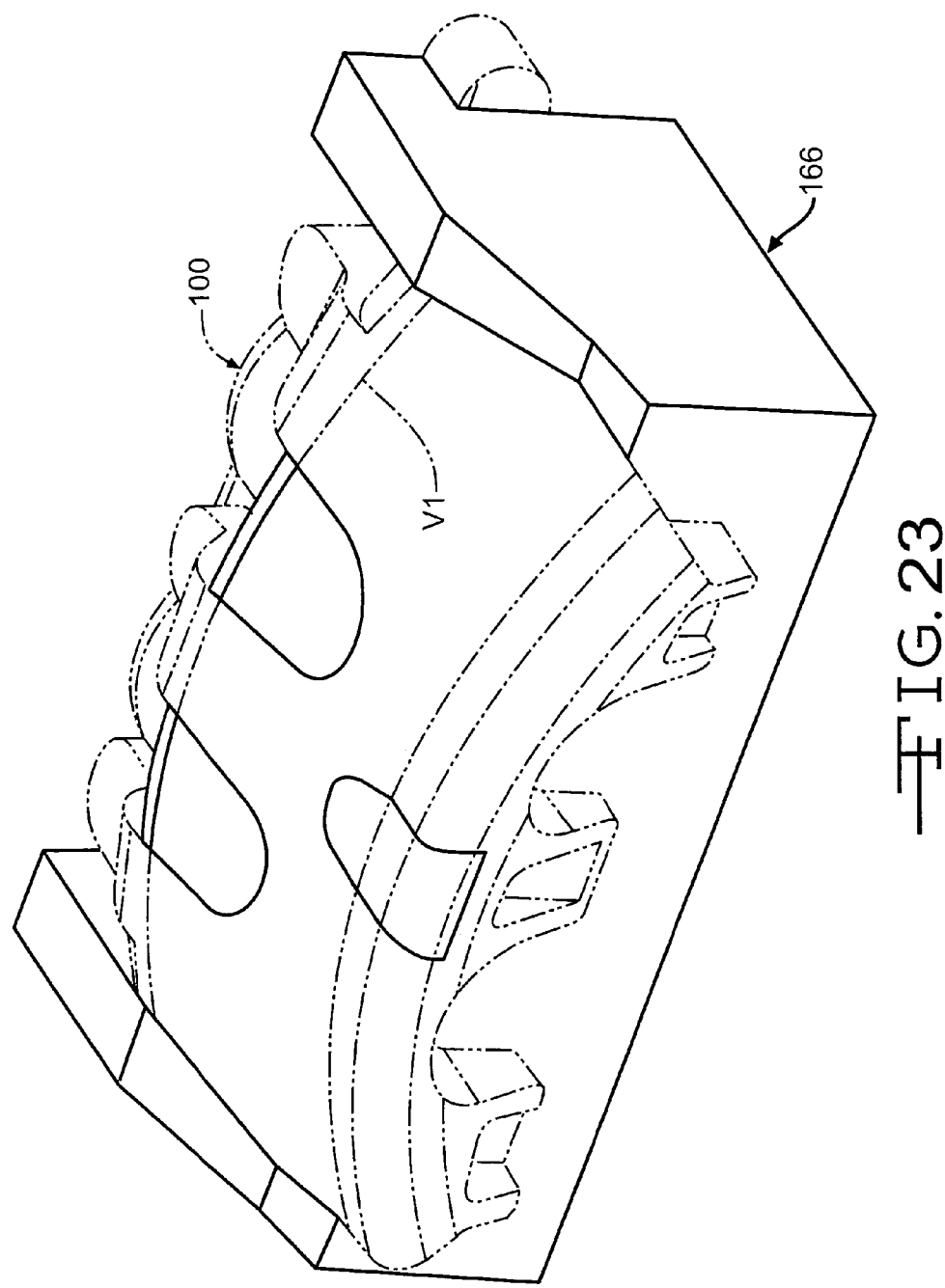
FIG. 23 is another perspective view of the casting apparatus according to the present invention with the mold portion thereof not being shown.

As best shown in FIG. 20, the core member 166 includes a first "male" extension or protuberance 170. The first extension 170 has a generally conical shape and is effective to produce the conical recess 130 in the brake caliper 100. The conical recess 130 of the first embodiment brake caliper 100 of the present invention is illustrative of the conical recesses of the various other embodiments described herein. Also, as best shown in FIG. 21, the core member 166 includes a pair of second male extensions or protuberances (only one of such extensions shown in FIG. 21 at 172). The second extensions 172 are generally flat planar surfaces and are effective to produce the generally flat surfaces 132 and 134 on the brake caliper 100. In addition, as best shown in FIG. 19, the core member 166 includes a pair of angled surfaces 176. The surfaces 176 are effective to produce the generally V-shaped angled flat surfaces 146 and 148 on the brake caliper 100.

Next, the "as cast" brake caliper 100 is removed from the casting apparatus during step 152. As discussed above, the as cast brake caliper 100 includes the conical recess 130 and the flat surfaces 132, 134, 146 and 148. As will be discussed below, the recess 130 and the surfaces 132 and 134 define locating surfaces and the surfaces 146 and 148 define clamping surfaces.

Figure 14:
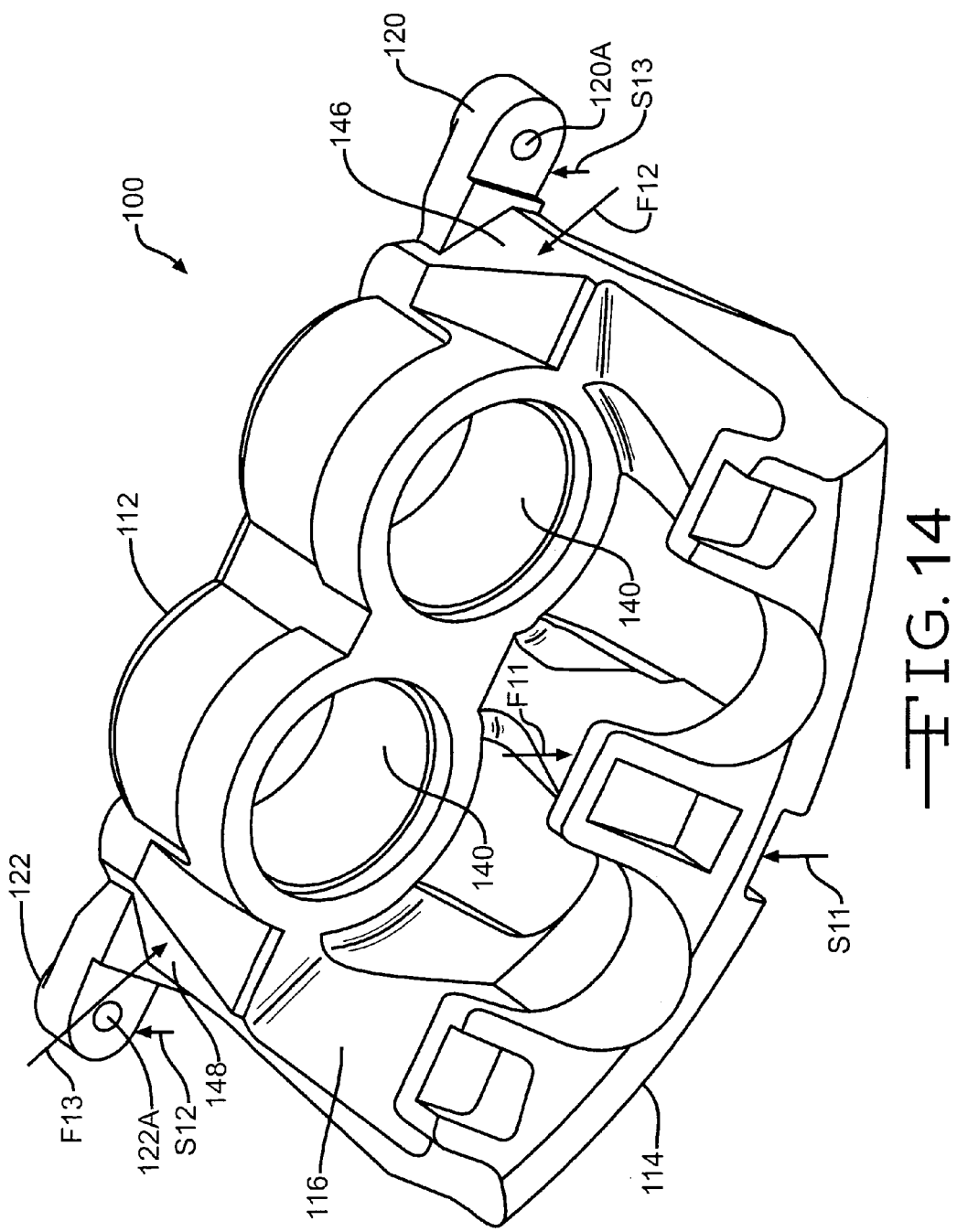
FIG. 14 is another perspective view of the first embodiment of the brake caliper of the present invention.

Following this, selected surfaces of the as cast brake caliper 100 are machined to predetermined tolerances using a known machining apparatus (not shown) during step 154. To accomplish this, the conical recess 130 and the surfaces 132 and 134 are used as datum or locating surfaces. In particular, the caliper 100 is positioned in an "upside down" position (i.e., bridge side facing down), as shown in FIG. 14, and supported in this position by a suitable first locating/supporting member (designated by arrow S11 in FIG. 14), which is disposed in the conical recess 130, and a pair of second locating/supporting members (designated by arrows S12 and S13 in FIG. 14), which engage the surfaces 132 and 134, respectively, to define a first horizontal plane Y1 of the as cast brake caliper 100.

Such a suitable first member is the predetermined sized ball 60 shown in phantom in FIG. 2 in conjunction with the prior art brake caliper 10; and a suitable pair of second members are a pair of pins with flat heads.

Next, while in this position, a first clamp member (not shown), which is operative to clamp and apply a first force F11 (shown in FIG. 11), to a selected surface of a middle finger of the outboard leg portion 114 of the caliper 100 generally opposite the ball 60 in the recess 130, and a pair of second clamp members (not shown), which are operative to clamp and apply a pair of second forces F12 and F13 (shown in FIG. 11), to the angled clamping surfaces 146 and 148 of the caliper, respectively, are used to define a second vertical plane X1 and also a third vertical plane Z1 of the caliper 100. Alternatively, other suitable methods can be used to hold or clamp the caliper 100 to enable the surfaces 130, 132, 134, 146 and 148 to be used as locating surfaces to determine the planes X1, Y1 and Z1 if so desired. In the illustrated embodiment, the X1 plane and the Z1 plane bisect one another in a generally perpendicular manner. And in the illustrated embodiment, the Y1 plane and the X1 plane bisect one another in a generally perpendicular manner. Alternatively, the orientation of one or more of the three planes X1, Y1 and Z1 can be other than illustrated if so desired.

In the illustrated embodiment, once the above described three planes X1, Y1 and Z1 of the vertical split line as cast brake caliper 100 have been established and with the forces F11, F12 and F13 applied, selected surfaces of the brake caliper 100 are machined to predetermined tolerances. In the illustrated embodiment, the selected surfaces include the machining of ears 120 and 122 and the machining of a pair of rough cast piston bores 140. In particular, as shown in FIG. 15, an outer surface 122B of the ear 22 is machined a predetermined distance A10 relative to the Z1 axis so as to define a flat outer surface which is in parallel relationship with the Z1 axis. Similarly, an outer surface 120B of the ear 120 is machined a predetermined distance A11 relative to the Z1 axis so as to define a flat outer surface which is in parallel relationship with the Z axis. In the illustrated embodiment, the distances A10 and A11 are the same.

Figure 16:
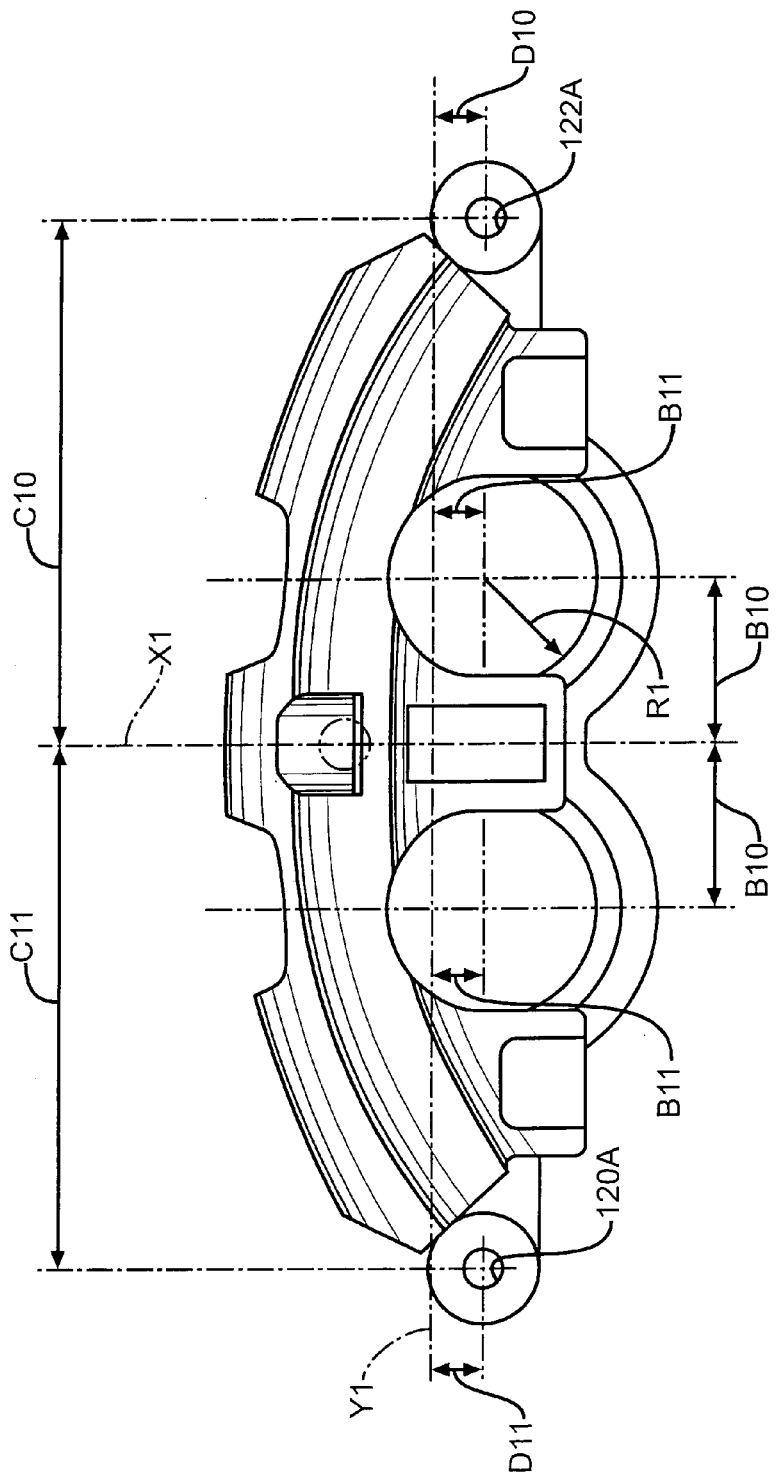
FIG. 16 is an inboard facing side view of the first embodiment of the brake caliper of the present invention.

Also, as shown in FIG. 16, the opening 122A is machined a predetermined distance C10 with respect to the X1 axis and a predetermined distance D10 with respect to the Y1 axis. Similarly, the opening 120A is machined a predetermined distance C11 with respect to the X1 axis and a predetermined distance D11 with respect to the Y1 axis. In the illustrated embodiment, the distances C10 and C11 are the same and the distances D10 and D11 are the same. In addition, as shown in FIG. 16, the piston bores 140 are machined with respect to the X1 axis a predetermined distance B10 and with respect to the Y1 axis a predetermined distance B11 so as to define piston bore radii R1. Following this, in step 156, other selected surfaces of the brake caliper 100 are machined to predetermined tolerances to produce the finish machined brake caliper 100. To accomplish this, one or more of the surfaces 120B and 122B, the apertures 120A and 122A, and the piston bores 140 are used as datum points to carry out the finish machining of the brake caliper 100 during step 156.

One advantage of the present invention is that the surfaces 130, 132, 134, 146 and 148 of the caliper 100 of this invention are accurately and reliably formed. This is due to the fact that the core 166 is operative to form the surfaces 130, 132, 134, 146 and 148. As a result of this, the surfaces 132 and 134 on the caliper 100 are spaced apart a predetermined distance D1, as shown in FIG. 15, and the surface 130 is spaced apart from the surfaces 132 and 134 a predetermined distance D2. Thus, even if there is slight shifting of the core 166 in the mold 162, since the core 166 determines and forms the surfaces 130, 132, 134, 146 and 148, the location of these surfaces is not affected. In the prior art caliper 10 or 10', since the mold 62 was operative to form the surfaces 30, 32, 34 and 35, any shifting or movement of the mold would affect the resultant location of these surfaces. Also, since the core 166 (which is destructible or consumable), includes the extension which is effective to produce the conical recess 130 in the brake caliper 100, the caliper 100 can be produced using either a vertical or horizontal split line casting process. In the prior art brake caliper 10 or 10', since the mold 62 (which is permanent or non-consumable), included the extension 70 to produce the conical recess 30 in the prior art cast brake caliper 10 or 10', the prior art brake caliper 10 or 10' could be produced using only a horizontal split line casting process (i.e., could not remove the prior art brake caliper 10 or 10' from the permanent mold 62 if a vertical split line casting process was attempted to be used because the cast part would be stuck in the mold in a "mold lock" situation).

Figure 24:
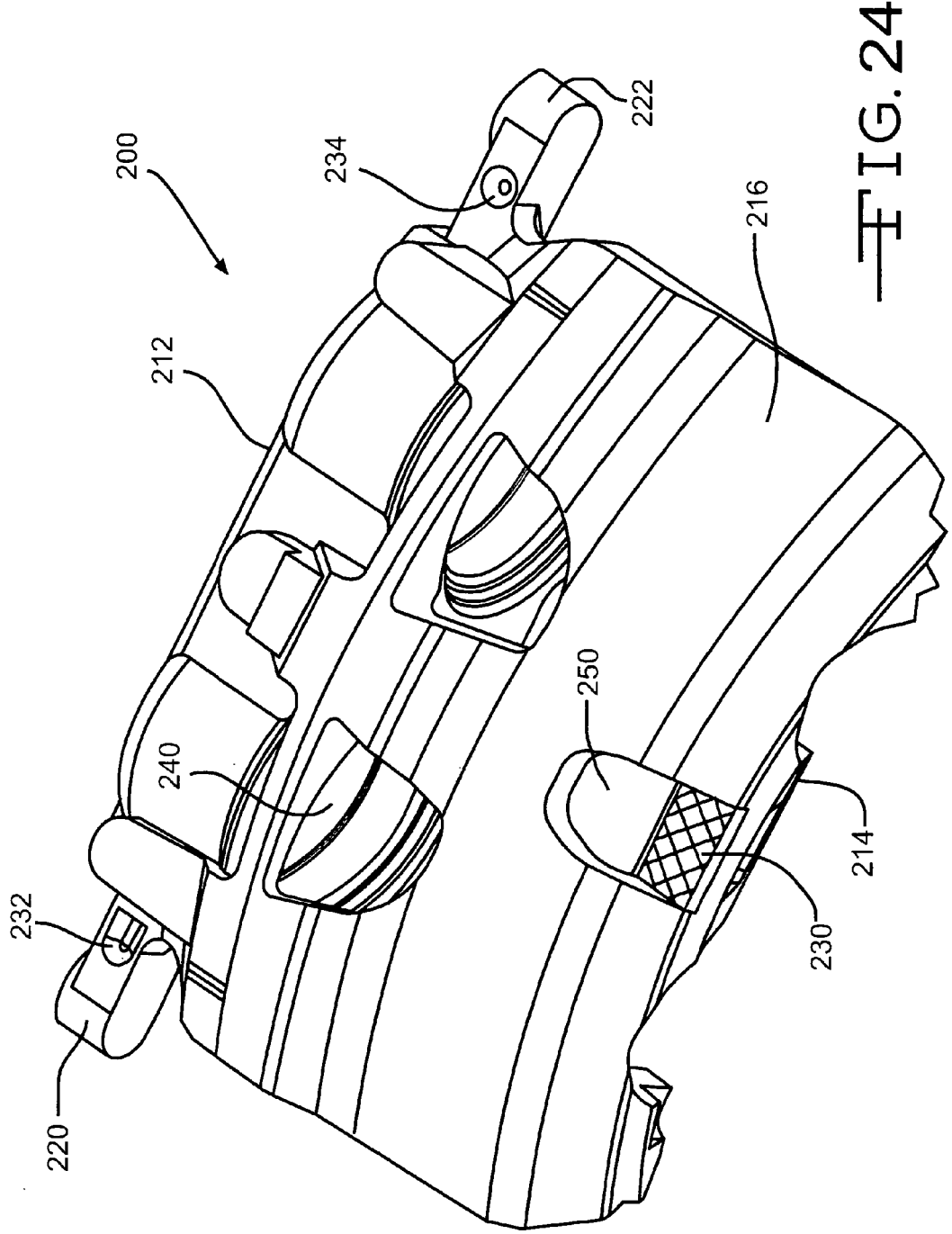
FIG. 24 is a perspective view of a second embodiment of a brake caliper produced in accordance with the present invention.

There is illustrated in FIG. 24 a second embodiment showing an alternate construction of a brake caliper 200 in accordance with the present invention. Though shown in FIG. 24 as a caliper of twin-pot construction, the structure of brake caliper 200 may be other than illustrated if so desired. For example, the brake caliper 200 may be of a single-pot design if so desired and remain within the scope of the present invention.

The brake caliper 200 includes an inboard leg portion 212 and an outboard leg portion 214, which are interconnected by an intermediate bridge portion 216. The intermediate bridge portion further includes an access aperture 250 formed therethrough. The outboard leg portion 214 includes an outboard locating surface 230 and the inboard leg portion 212 includes a pair of surfaces 232 and 234.

The outboard locating surface 230 is formed on an upper surface of the outboard leg 214 exposed by an overlapping orientation of the access aperture 250 thereto and in the illustrated embodiment is a generally flat surface. The outboard locating surface 230 and the surfaces 232 and 234 are preferably as cast surfaces accurately formed during the casting process although slight cleaning or brushing of one or more of the outboard locating surface 230 and the surfaces 232 and 234 may occur subsequent to the casting process. In the illustrated embodiment, the surface 232 is illustrated as being a channel shaped depression terminating in a half cone structure though may be other than as illustrated if so desired. The surface 232 may be positioned on any surface suitable for locating the caliper for subsequent machining operations. An example of such a suitable surface is illustrated as an outer surface of the ear 220, though another surface may be provided if so desired.

In the illustrated embodiment, the surface 234 is illustrated as being a conical recess though may be other than as illustrated if so desired. The surface 234 may be positioned on any surface suitable for locating the caliper for subsequent machining operations. An example of such a suitable surface is illustrated as an outer surface of the ear 222, though another surface may be provided if so desired. Alternatively, the construction of the brake caliper 200, including the location and/or shape of one or more of the surfaces 230, 232 and 234, may be other than illustrated if so desired.

Figure 25:
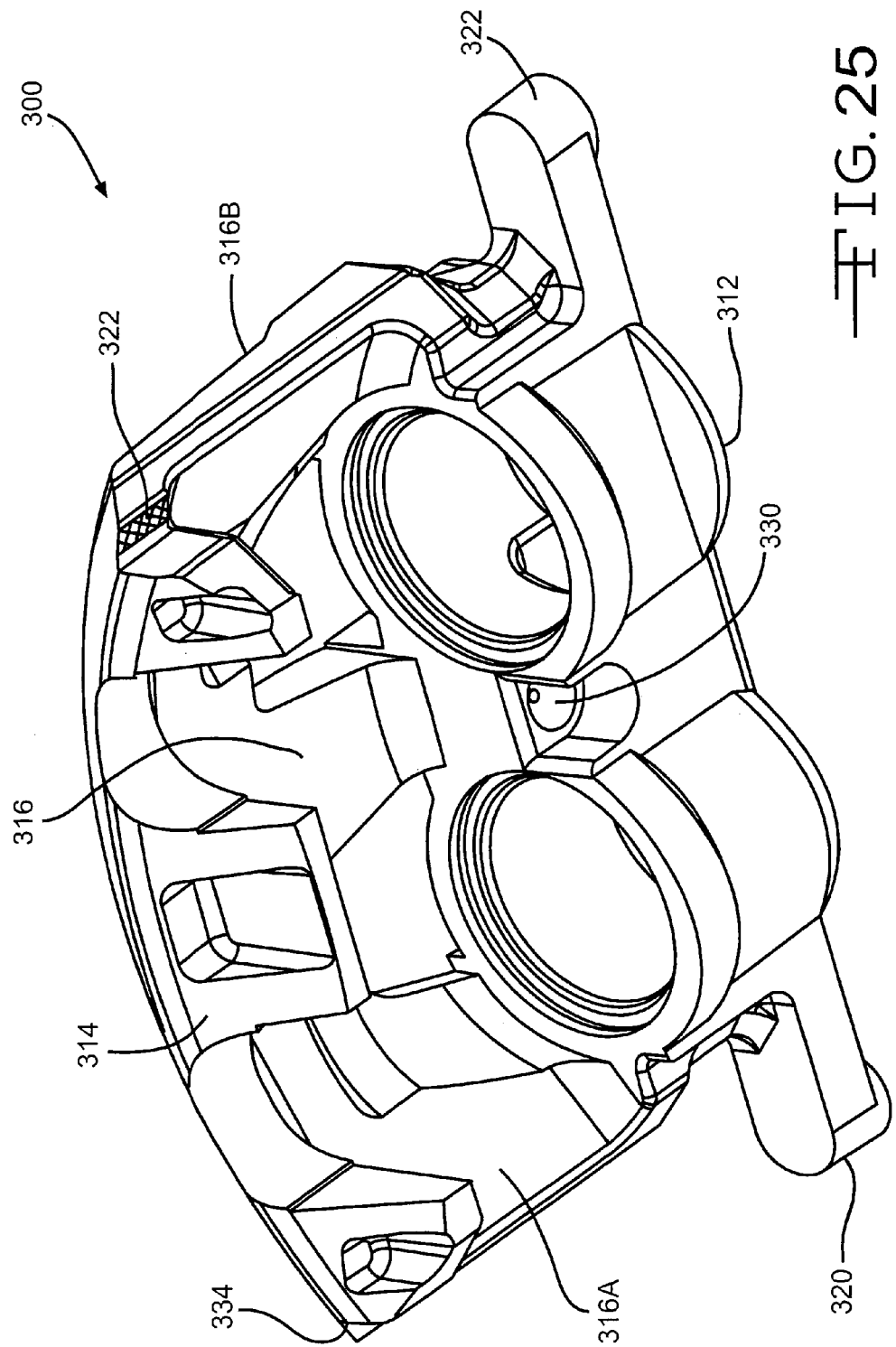
FIG. 25 is a perspective view of a third embodiment of a brake caliper produced in accordance with the present invention.

Turning now to FIG. 25 there is illustrated a third embodiment of a brake caliper, indicated generally at 300, produced in accordance with the present invention. Though shown in FIG. 25 as a caliper of twin-pot construction, the structure of brake caliper 300 may be other than illustrated if so desired. For example, the brake caliper 300 may be of a single-pot design if so desired and remain within the scope of the present invention.

The brake caliper 300 includes an inboard leg portion 312 and an outboard leg portion 314 which are interconnected by an intermediate bridge portion 316. The bridge portion 316 further has a lower side 316A and an upper side 316B. The inboard leg 312 of the brake caliper 300 includes a pair of ears 320 and 322.

The brake caliper 300 further includes a recess 330 located on the inboard leg portion 312 and a pair of surfaces 332 and 334 located on the outboard leg portion 314. The recess 330 and the surfaces 332 and 334 are arranged on the same side as the bridge lower side 316A and define a locating plane thereon. In the illustrated embodiment, the recess 330 is preferably a generally conical-shaped closed recess and the surfaces 332 and 334 are preferably generally flat surfaces. Also, the recess 330 and the surfaces 332 and 334 are preferably as cast surfaces accurately formed during the casting process although slight cleaning or brushing of one or more of the recess 330 and the surfaces 332 and 334 may occur subsequent to the casting process. Alternatively, the construction of the brake caliper 300, including the location and/or shape of one or more of the recess 330 and the surfaces 332 and 334, may be other than illustrated if so desired.

Figure 26:
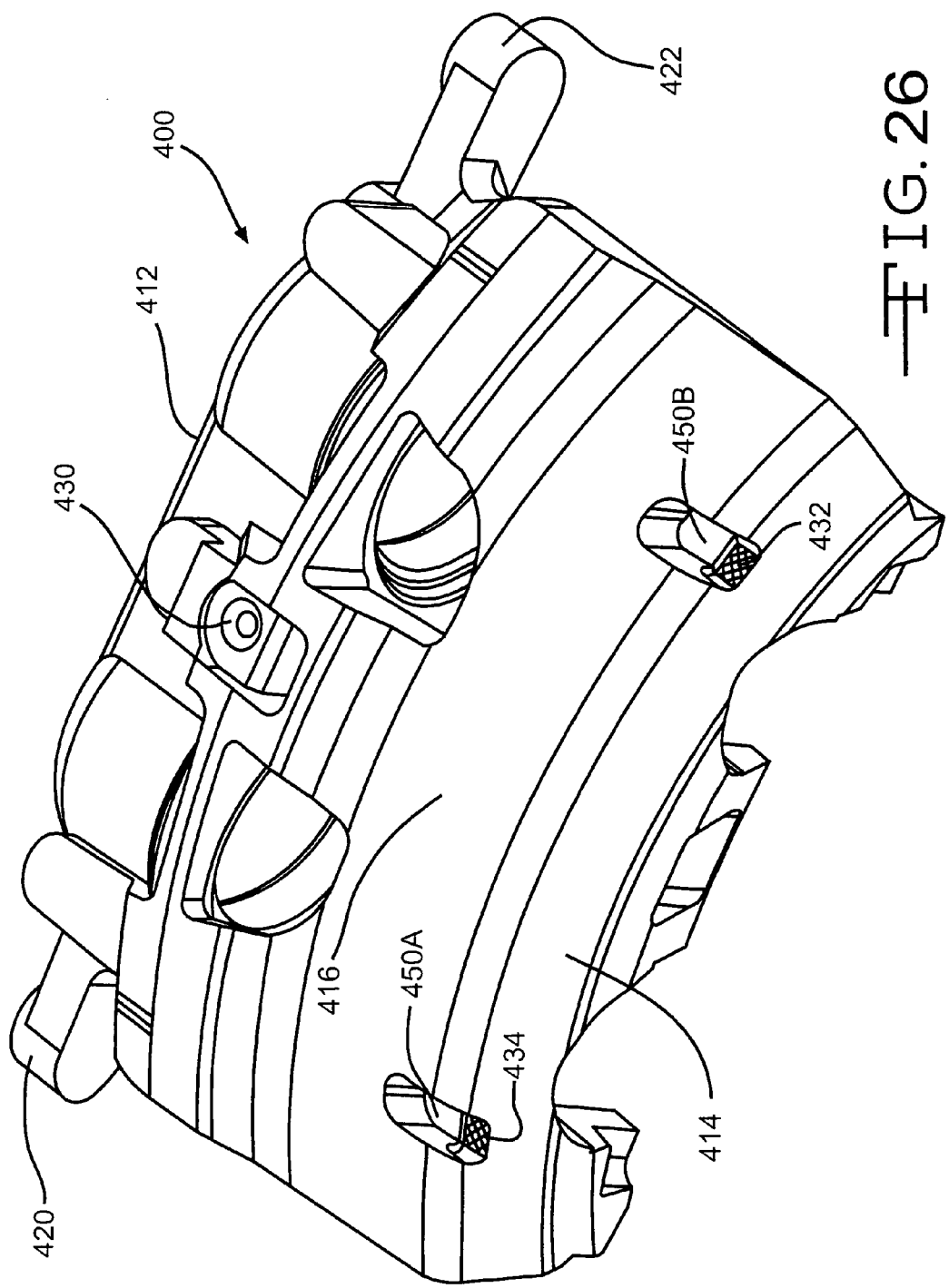
FIG. 26 is a perspective view of a fourth embodiment of a brake caliper produced in accordance with the present invention.

Turning now to FIG. 26 there is illustrated a fourth embodiment showing an alternate construction of a brake caliper 400 in accordance with the present invention. The structure of brake caliper 400, though shown in FIG. 26 as a caliper of twin-pot construction, may be other than illustrated. For example, the brake caliper 400 may be of a single-pot design if so desired and remain within the scope of the present invention.

In the illustrated embodiment, the brake caliper 400 includes an inboard leg portion 412 and an outboard leg portion 414, which are interconnected by an intermediate bridge portion 416. The intermediate bridge portion 416 further includes a pair of access apertures 450A and 450B formed therethrough to expose a pair of surfaces 432 and 434. In the illustrated embodiment, the surfaces 432 and 434 are each formed on an upper surface of the outboard leg 414 and are preferably generally flat.

In the illustrated embodiment, the brake caliper 400 further includes a surface 430 provided on the inboard leg portion 412. The surface 430 is preferably a generally conical-shaped closed recess, though any other shape suitable to serve a caliper locating purpose may be used if so desired. The recess 430 and the surfaces 432 and 434 are preferably as cast surfaces accurately formed during the casting process although slight cleaning or brushing of one or more of the recess 430 and the surfaces 432 and 434 may occur subsequent to the casting process. Alternatively, the construction of the brake caliper 400, including the location and/or shape of one or more of the surfaces 430, 432 and 434, may be other than illustrated if so desired.

Figure 27:
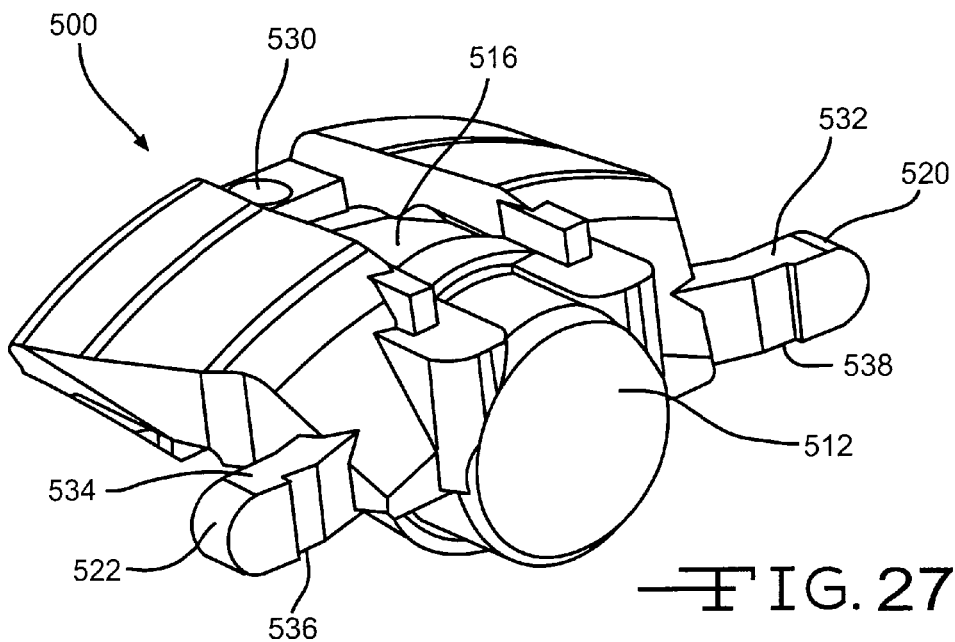
FIG. 27 is a perspective view of a fifth embodiment of a brake caliper produced in accordance with the present invention.
Figure 28:
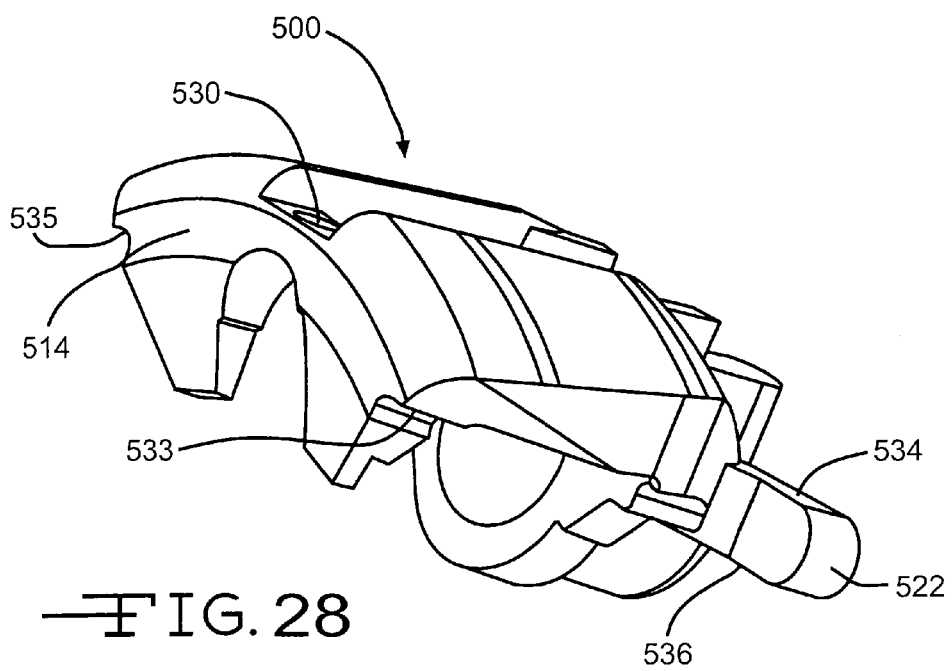
FIG. 28 is another perspective view of a fifth embodiment of the brake caliper produced in accordance with the present invention.

There is illustrated in FIGS. 27 and 28 a fifth embodiment of a brake caliper 500 made in accordance with the present invention. The structure of brake caliper 500, though shown in FIGS. 27 and 28 as a caliper of single-pot construction, may be other than illustrated. For example, the brake caliper 500 may be of a twin-pot design if so desired and remain within the scope of the present invention. The brake caliper 500 illustrates a single-pot brake caliper having a plurality of surfaces 530, 532, 533, 534, 535, 536, and 538. Each of the plurality of surfaces may be adapted to provide a locating surface as described in any of the previous illustrated embodiments of the present invention. The plurality of locating surfaces is further presented for illustration purposes and is in no way intended to limit the application of any of the previous embodiments to the construction of a single-pot type brake caliper in accordance with the present invention. For example, the surfaces 532 and 534 may be adapted to provide locating features similar to the surfaces 232 and 234 as illustrated in FIG. 24, if so desired. The surface 530 may be adapted to provide either a conical recess, similar to conical recess 430 of FIG. 26, or a generally flat planar surface, similar to surface 230 of FIG. 24, if so desired. One or more of the plurality of locating surfaces 530, 532, 533, 534, 535, 536, and 538 of the brake caliper 500 however may be other than illustrated if so desired and remain within the scope of the present invention.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A cast brake caliper adapted for use in a disc brake assembly comprising:
    a cast brake caliper having an inboard leg portion and an outboard leg portion which are interconnected by an intermediate bridge portion, only the inboard leg portion of the brake caliper including at least one piston bore formed therein, the brake caliper having three locating surfaces which are configured to define predetermine datum surfaces, at least one locating surface provided on the inboard leg portion and at least one locating surface provided on the outboard leg portion;
    at least one through opening formed completely through the intermediate bridge portion of the brake caliper, the at least one through opening formed beginning in the intermediate bridge portion and extending into the outboard leg portion and continuing over the at least one locating surface provided on the outboard leg portion so that no portion of the intermediate bridge portion covers the at least one locating surface provided on the outboard leg portion to thereby enable the core member to form the at least one locating surface on the outboard leg portion during the casting of the brake caliper, and wherein the three locating surfaces includes at least one conically-shaped closed recess and at least one generally flat surface; and
    wherein the three locating surfaces are provided on an exterior upper side of the inboard and outboard leg portions of the cast brake caliper and define the predetermined datum surfaces for subsequent machining of the cast brake caliper to predetermined tolerances using the three locating surfaces as the predetermined datum surfaces to machine the cast brake caliper.

2. The cast brake caliper of claim 1 wherein two locating surfaces are provided on the inboard leg portion and one locating surface is provided on the outboard leg portion.

3. The cast brake caliper of claim 2 wherein the two locating surfaces provided on the inboard leg portion are different from one another.

4. The cast brake caliper of claim 3 wherein the two locating surfaces provided on the inboard leg portion are the conically-shaped closed recess and a generally channel shaped depression terminating in a trough.

5. The cast brake caliper of claim 3 wherein the one locating surface provided on the outboard leg portion is different from the two locating surfaces provided on the inboard leg portion.

6. The cast brake caliper of claim 5 wherein the one locating surface provided on the outboard leg portion is a generally flat surface.

7. The cast brake caliper of claim 1 wherein one locating surface is provided on the inboard leg portion and two locating surfaces are provided on the outboard leg portion.

8. The cast brake caliper of claim 7 wherein the two locating surfaces provided on the outboard leg portion are the same as one another.

9. The cast brake caliper of claim 8 wherein the two locating surfaces provided on the outboard leg portion are generally flat surfaces.

10. The cast brake caliper of claim 8 wherein the one locating surface provided on the inboard leg portion is different from the two locating surfaces provided on the outboard leg portion.

11. The cast brake caliper of claim 10 wherein the one locating surface provided on the inboard leg portion is the conically-shaped closed recess.

12. The cast brake caliper of claim 7 wherein the three locating surfaces are arranged on one of a bridge lower side and a bridge upper side.

13. The cast brake caliper of claim 12 wherein the three locating surfaces are arranged on the same side of the bridge lower side and a bridge upper side.

14. The cast brake caliper of claim 1 wherein the cast brake caliper includes one piston bore formed therein and the cast brake caliper is a single piston brake caliper.

15. The cast brake caliper of claim 1 wherein the cast brake caliper includes two piston bores formed therein and is a twin piston brake caliper.

16. The cast brake caliper of claim 1 wherein the three locating surfaces are arranged on one of a bridge lower side and a bridge upper side.

17. The cast brake caliper of claim 16 wherein the three locating surfaces are arranged on the same side of the bridge lower side and the bridge upper side.

18. The cast brake caliper of claim 1 wherein the conically-shaped closed recess extends radially downwardly from the exterior upper side and into a respective one of the inboard and outboard leg portion of the cast brake caliper.

19. The cast brake caliper of claim 1 wherein the conically-shaped closed recess extends radially downwardly from the exterior upper side and into the inboard leg portion of the cast brake caliper.

20. A cast brake caliper adapted for use in a disc brake assembly comprising:
    a cast brake caliper having an inboard leg portion and an outboard leg portion which are interconnected by an intermediate bridge portion and at least one piston bore formed therein, only the inboard leg portion of the brake caliper including the at least one piston bore formed therein, the brake caliper having three locating surfaces which are configured to define predetermine datum surfaces, at least one locating surface provided on the inboard leg portion and at least one locating surface provided on the outboard leg portion;
    at least one through opening formed completely through the intermediate bridge portion of the brake caliper, the at least one through opening formed beginning in the intermediate bridge portion and extending into the outboard leg portion and continuing over the at least one locating surface provided on the outboard leg portion so that no portion of the intermediate bridge portion covers the at least one locating surface provided on the outboard leg portion to thereby enable the core member to form the at least one locating surface on the outboard leg portion during the casting of the brake caliper, and wherein the three locating surfaces includes at least one conically-shaped closed recess and at least one generally flat surface;

wherein the three locating surfaces are provided on an exterior upper side of the inboard and outboard leg portions of the cast brake caliper and define the predetermined datum surfaces for subsequent machining of the cast brake caliper to predetermined tolerances using the three locating surfaces as the predetermined datum surfaces to machine the cast brake caliper; and wherein the conically-shaped closed recess extends radially downwardly from the exterior upper side and into a respective one of the inboard and outboard leg portion of the cast brake caliper.

* * * * *